United States Patent
Cheng et al.

(10) Patent No.: US 11,903,058 B2
(45) Date of Patent: Feb. 13, 2024

(54) RRC TIMER FOR LAYER 2 UE-TO-NETWORK RELAY

(71) Applicant: QUALCOMM Incorporated, San Diego, CA (US)

(72) Inventors: Peng Cheng, Beijing (CN); Karthika Paladugu, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/900,621

(22) Filed: Aug. 31, 2022

(65) Prior Publication Data
US 2023/0077496 A1 Mar. 16, 2023

Related U.S. Application Data

(63) Continuation of application No. PCT/CN2021/118728, filed on Sep. 16, 2021.

(51) Int. Cl.
*H04W 4/00* (2018.01)
*H04W 76/14* (2018.01)
(Continued)

(52) U.S. Cl.
CPC .......... *H04W 76/14* (2018.02); *H04W 76/19* (2018.02); *H04W 76/27* (2018.02)

(58) Field of Classification Search
CPC ...... H04W 76/14; H04W 76/19; H04W 76/27
(Continued)

(56) References Cited

U.S. PATENT DOCUMENTS 11,665,768 B2 * 5/2023 Kreiner ................. H04W 76/19
370/329
11,743,910 B2 * 8/2023 Lee ....................... H04W 72/23
370/329
(Continued)

FOREIGN PATENT DOCUMENTS

CN 107431980 A 12/2017
CN 107439040 A 12/2017
(Continued)

OTHER PUBLICATIONS

Intel Corporation: "Signalling Considerations for Relay UE Initiation", 3GPP TSG RAN WG2 Meeting #91, R2-153675, Beijing, China, Aug. 24, 2015-Aug. 28, 2015, 5 Pages, Aug. 28, 2015 (Aug. 28, 2015) the whole document.
(Continued)

*Primary Examiner* — Marceau Milord
(74) *Attorney, Agent, or Firm* — Procopio, Cory, Hargreaves & Savitch LLP/QUALCOMM Incorporated

(57) ABSTRACT

A method, apparatus, and computer-readable storage medium for wireless communication at a first user equipment (UE) is provided. The UE receives an indication of one or more timers associated with a radio resource control (RRC) connection establishment procedure or an RRC connection re-establishment procedure with a network entity via a relay. The UE transmits a request associated with an RRC connection to a second UE to be relayed to the network entity and monitors for a response from the network entity based on the one or more timers associated with the RRC connection establishment procedure or the RRC connection re-establishment procedure via the second UE as the relay.

95 Claims, 20 Drawing Sheets

---

1500

1502
Receive an indication of one or more timers for RRC connection with a base station via a relay 1504
Transmit a request associated with an RRC connection to a second UE to be relayed to the base station 1506
Monitor for a response from the base station based on the one or more timers associated with the RRC connection procedure via the second UE as the relay

(51) Int. Cl.
*H04W 76/27* (2018.01)
*H04W 76/19* (2018.01)

(58) Field of Classification Search
USPC .................................................. 370/328, 329
See application file for complete search history.

(56) References Cited

U.S. PATENT DOCUMENTS

| | | | | |
|---|---|---|---|---|
| 2018/0020442 | A1* | 1/2018 | Nair | H04B 7/15 |
| 2018/0213577 | A1* | 7/2018 | Burbidge | H04W 76/10 |
| 2019/0223008 | A1* | 7/2019 | Vanderveen | H01Q 21/205 |
| 2020/0092784 | A1* | 3/2020 | Hampel | H04B 7/15528 |
| 2020/0221532 | A1* | 7/2020 | Jung | H04W 76/10 |
| 2020/0229007 | A1* | 7/2020 | Jung | H04W 72/04 |
| 2020/0252989 | A1* | 8/2020 | Chen | H04L 5/0048 |
| 2020/0260347 | A1* | 8/2020 | Xu | H04W 36/0069 |
| 2020/0383166 | A1* | 12/2020 | Venkataraman | H04W 76/30 |
| 2021/0051758 | A1 | 2/2021 | Xu et al. | |
| 2021/0185521 | A1* | 6/2021 | Purkayastha | H04W 76/25 |
| 2021/0185757 | A1* | 6/2021 | Purkayastha | H04W 76/14 |
| 2021/0251023 | A1* | 8/2021 | Phan | H04W 76/40 |
| 2021/0251039 | A1* | 8/2021 | Liang | H04W 76/23 |
| 2021/0400745 | A1* | 12/2021 | Kuo | H04W 80/02 |
| 2021/0400746 | A1* | 12/2021 | Kuo | H04W 80/02 |
| 2021/0410215 | A1* | 12/2021 | Kuo | H04W 76/14 |
| 2022/0167268 | A1* | 5/2022 | Xu | H04W 52/0216 |
| 2022/0174758 | A1* | 6/2022 | Pan | H04W 76/12 |
| 2022/0394807 | A1* | 12/2022 | Xu | H04W 88/04 |
| 2022/0394907 | P1* | 12/2022 | Post | A01H 6/1424 Plt./294 |
| 2022/0408509 | A1* | 12/2022 | Xu | H04W 76/10 |
| 2023/0262634 | A1* | 8/2023 | Kim | H04W 56/0045 370/350 |

FOREIGN PATENT DOCUMENTS

| | | |
|---|---|---|
| CN | 107637162 A | 1/2018 |
| CN | 113330815 A | 8/2021 |

OTHER PUBLICATIONS

International Search Report and Written Opinion—PCT/CN2021/118728—ISA/EPO—dated May 27, 2022 (2107819WO1).

3GPP TS 23.304, "3rd Generation Partnership Project, Technical Specification Group Services and System Aspects, Proximity based Services (ProSe) in the 5G System (5GS) (Release 17)", 3GPP TS 23.304 V2.0.0, Sep. 2021, pp. 1-99 pgs.

3GPP TS 38.331, "3rd Generation Partnership Project, Technical Specification Group Radio Access Network, NR, Radio Resource Control (RRC) protocol specification (Release 16)", 3GPP TS 38.331 V16.5.0, Jun. 2021, pp. 1-956, section 7.1 (Including sections 7.1.1 and 7.1.2).

"3rd Generation Partnership Project, Technical Specification Group Radio Access Network, Study on NR Sidelink Relay, (Release 17) ", 3GPP Standard, Technical Report, 3GPP TR 38.836, 3rd Generation Partnership Project, Mobile Competence Centre, 650, Route Des Lucioles, F-06921 Sophia-Antipolis Cedex, France, vol. RAN WG2, No. V17.0.0 Mar. 29, 2021, XP052000125, pp. 1-26, sections 5-6, paragraph [4.5.4.2] figures 4.5.4.2-1.

Ericsson (Moderator)., et al., "New WID on NR Sidelink Relay", RP-210904, 3GPP TSG RAN Meeting #91e, Electronic Meeting, Mar. 16-26, 2021, 6 Pages.

* cited by examiner

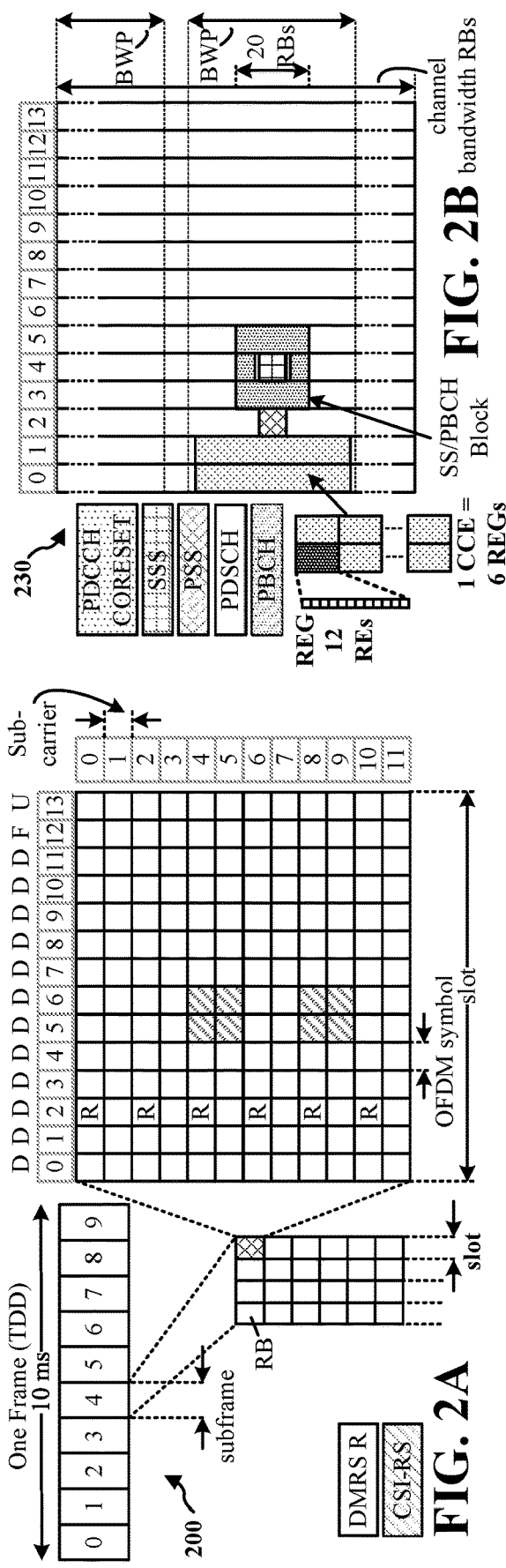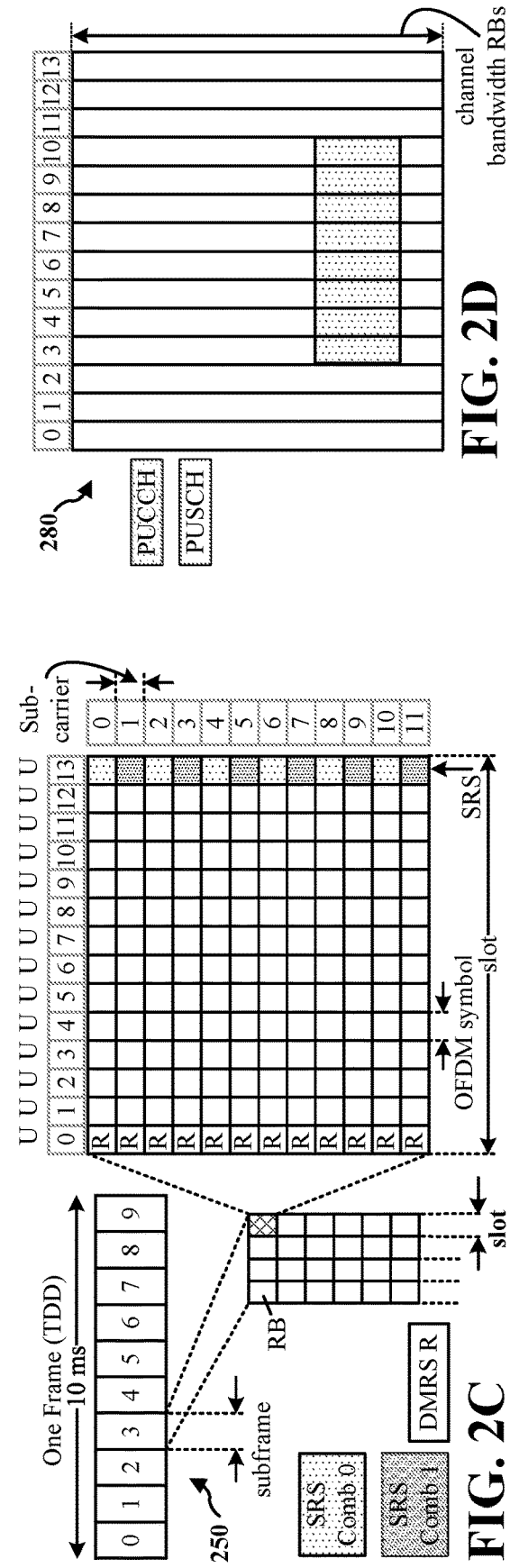

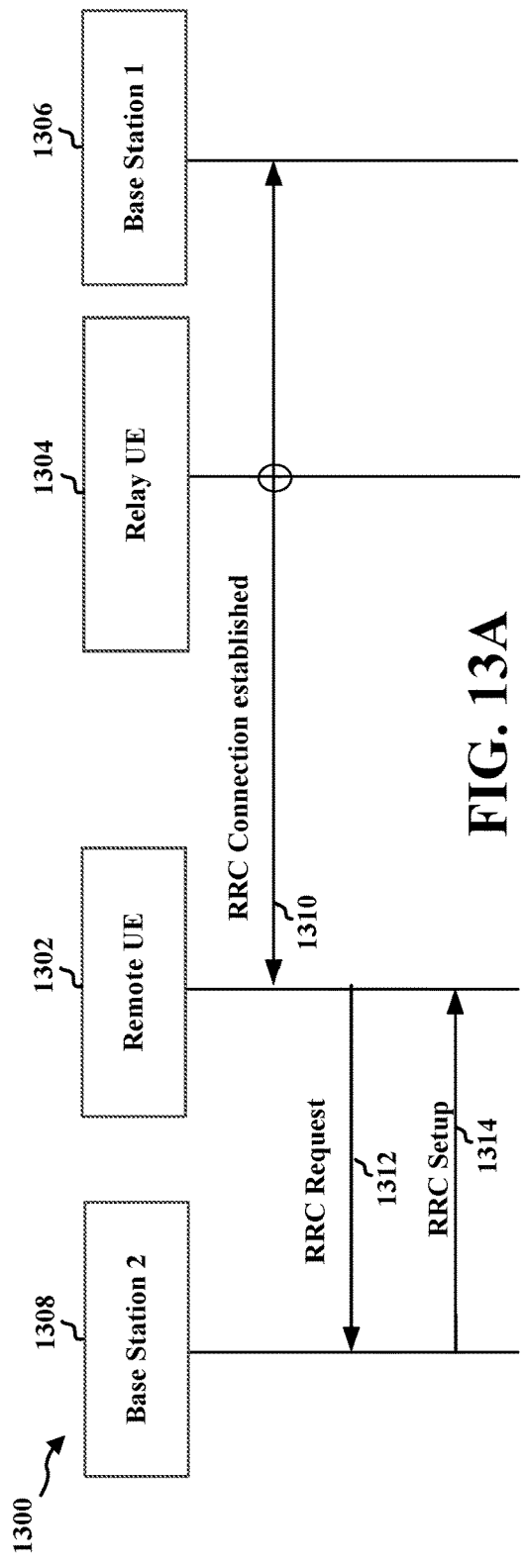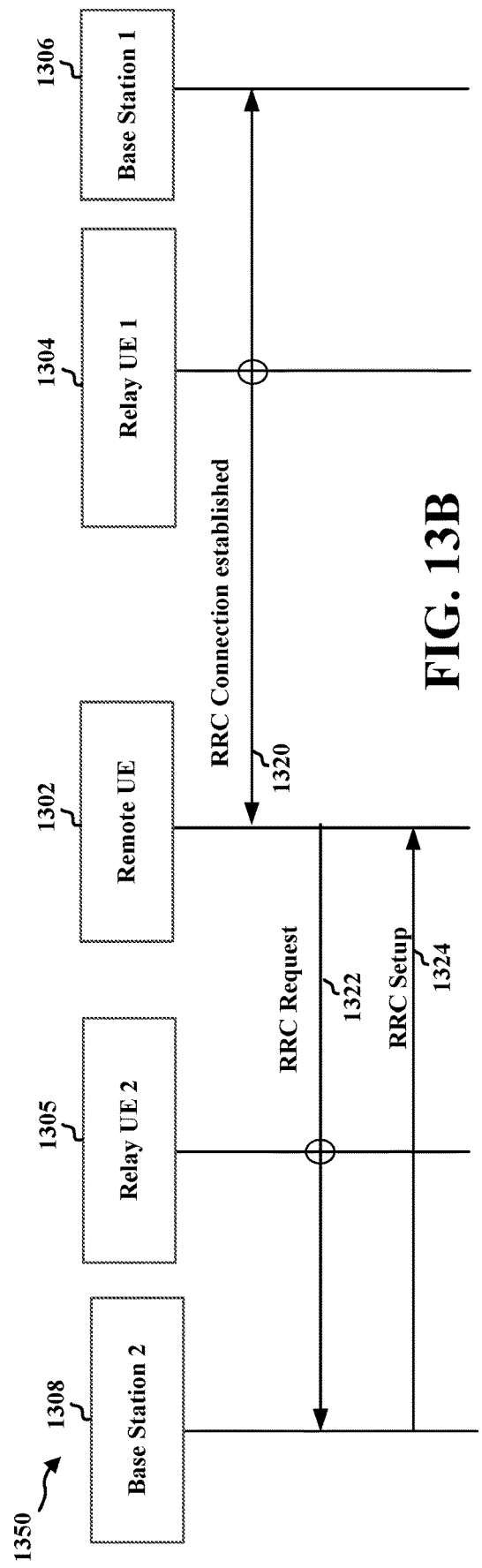

RRC TIMER FOR LAYER 2 UE-TO-NETWORK RELAY

CROSS REFERENCE TO RELATED APPLICATION(S)

This application is a continuation of International Application Serial No. PCT/CN2021/118728 entitled "RRC Timer for Layer 2 UE-to-Network Relay" and filed on Sep. 16, 2021, which is expressly incorporated by reference herein in its entirety.

INTRODUCTION

The present disclosure relates generally to communication systems, and more particularly, to wireless communication including a radio resource control (RRC) connection.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at a first user equipment (UE) is provided. The method includes receiving an indication of one or more timers associated with a radio resource control (RRC) connection establishment procedure or an RRC connection re-establishment procedure with a network entity via a relay. The method includes transmitting a request associated with an RRC connection to a second UE to be relayed to the network entity and monitoring for a response from the network entity based on the one or more timers associated with the RRC connection establishment procedure or the RRC connection re-establishment procedure via the second UE as the relay.

In an aspect of the disclosure, an apparatus for wireless communication at a first UE is provided. The apparatus includes means for receiving an indication of one or more timers associated with an RRC connection establishment procedure or an RRC connection re-establishment procedure with a network entity via a relay. The apparatus includes means for transmitting a request associated with an RRC connection to a second UE to be relayed to the network entity and means for monitoring for a response from the network entity based on the one or more timers associated with the RRC connection establishment procedure or the RRC connection re-establishment procedure via the second UE as the relay.

In an aspect of the disclosure, an apparatus for wireless communication at a first UE is provided. The apparatus includes memory and at least one processor coupled to the memory. The at least one processor is configured to receive an indication of one or more timers associated with an RRC connection establishment procedure or an RRC connection re-establishment procedure with a network entity via a relay, transmit a request associated with an RRC connection to a second UE to be relayed to the network entity, and monitor for a response from the network entity based on the one or more timers associated with the RRC connection establishment procedure or the RRC connection re-establishment procedure via the second UE as the relay.

In an aspect of the disclosure, a non-transitory computer-readable storage medium storing computer executable code for wireless communication at a first UE is provided. The code when executed by a processor causes the processor to receive an indication of one or more timers associated with an RRC connection establishment procedure or an RRC connection re-establishment procedure with a network entity via a relay, transmit a request associated with an RRC connection to a second UE to be relayed to the network entity, and monitor for a response from the network entity based on the one or more timers associated with the RRC connection establishment procedure or the RRC connection re-establishment procedure via the second UE as the relay.

In an aspect of the disclosure, a method of wireless communication at a network entity is provided. The method includes outputting system information indicating one or more timers for an RRC connection establishment procedure or an RRC connection re-establishment procedure of a first UE via a relay; and obtaining a relayed request associated with an RRC connection for the first UE.

In an aspect of the disclosure, an apparatus for wireless communication at a network entity is provided. The apparatus includes means for outputting system information indicating one or more timers for an RRC connection establishment procedure or an RRC connection re-establishment procedure of a first UE via a relay; and means for obtaining a relayed request associated with an RRC connection for the first UE.

In an aspect of the disclosure, an apparatus for wireless communication at a network entity is provided. The apparatus includes memory and at least one processor coupled to the memory. The at least one processor is configured to output system information indicating one or more timers for an RRC connection establishment procedure or an RRC connection re-establishment procedure of a first UE via a relay; and obtain a relayed request associated with an RRC connection for the first UE.

In an aspect of the disclosure, a non-transitory computer-readable storage medium storing computer executable code for wireless communication at a network entity is provided. The code when executed by a processor causes the processor to output system information indicating one or more timers for an RRC connection establishment procedure or an RRC connection re-establishment procedure of a first UE via a relay; and obtain a relayed request associated with an RRC connection for the first UE.

In an aspect of the disclosure, a method of wireless communication at a second UE is provided. The method includes transmitting a sidelink message indicating one or more timer for a RRC connection establishment procedure or an RRC connection re-establishment procedure of a remote UE with a network entity via a relay UE, the one or more timer including additional amount of time for the RRC connection procedure via the relay UE; and receiving a request associated with an RRC connection from the remote UE for relay to the network entity.

In an aspect of the disclosure, an apparatus for wireless communication at a second UE is provided. The apparatus includes means for transmitting a sidelink message indicating one or more timers associated with an RRC connection establishment procedure or an RRC connection re-establishment procedure of a first UE with a network entity via the second UE, the one or more timers including additional amount of time for the RRC connection procedure via the second UE; and means for receiving a request associated with an RRC connection from the remote UE for relay to the network entity.

In an aspect of the disclosure, an apparatus for wireless communication at a second UE is provided. The apparatus includes memory and at least one processor coupled to the memory. The memory and the at least one processor are configured to transmit a sidelink message indicating one or more timers associated with an RRC connection establishment procedure or an RRC connection re-establishment procedure of a first UE with a network entity via the second UE, the one or more timers including additional amount of time for the RRC connection procedure via the second UE; and receive a request associated with an RRC connection from the remote UE for relay to the network entity.

In an aspect of the disclosure, a non-transitory computer-readable storage medium storing computer executable code for wireless communication at a second UE is provided. The code when executed by a processor causes the processor to transmit a sidelink message indicating one or more timers associated with an RRC connection establishment procedure or an RRC connection re-establishment procedure of a first UE with a network entity via the second UE, the one or more timers including additional amount of time for the RRC connection procedure via the second U; and receive a request associated with an RRC connection from the remote UE for relay to the network entity.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 13A and 13B illustrate communication flows between a remote UE, a relay UE, and a network.

DETAILED DESCRIPTION

Figure 1:
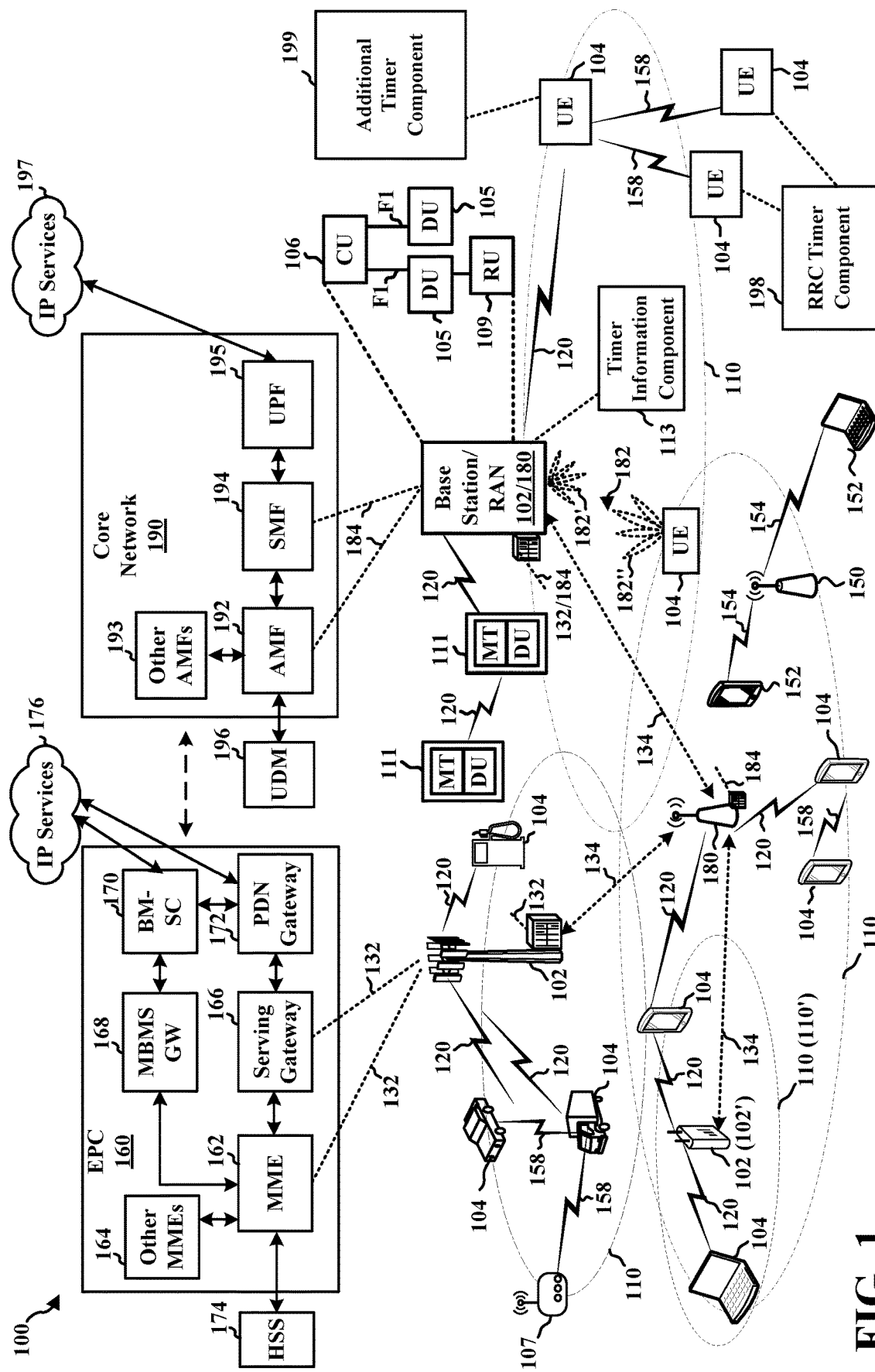
FIG. 1 is a diagram illustrating an example of a wireless communications system and an access network.

A wireless device, such as a UE, may support communication with a network entity over a connection based on a first radio access technology (RAT) (e.g., a Uu interface) and may support communication with another wireless device over a connection based on a different RAT (e.g., a sidelink interface, a Bluetooth low energy (BLE) interface, a WiFi-D interface, a WiFi interface, or a bluetooth (BL) regular interface, etc.). In some circumstances, the wireless device may not be able to reach the network entity using the Uu interface or may determine that the Uu interface is not suitable for current traffic criteria. The wireless device may establish a link, such as a sidelink, with a relay device to relay communication from the wireless device over a Uu connection to a base station. For example, a first UE may establish a sidelink with a second UE to relay communication from the first UE to a base station over a Uu connection between the second UE and the base station. The first UE may be referred to as a "remote UE," and the second UE may be referred to as a "relay device" in some aspects. As an example, a remote UE may establish a sidelink connection with a relay UE and may transmit and receive relayed messages over the sidelink connection to establish an RRC connection with a base station through the relay UE. The remote UE may apply one or more timers when performing RRC connection procedures with the base station via the relay UE. Non-limiting examples of RRC connection procedures include establishing an RRC connection with the base station via the relay UE, resuming an RRC connection with the base station via the relay UE, or reestablishing an RRC connection with the base station via the relay UE. The timers may expire based on the relay of communication via the relay UE. As an example, a relay UE that is in an RRC idle or RRC inactive state the base station may use additional time to establish an RRC connection with a base station before relaying an RRC connection request from the remote UE. The added time may cause one or more timers to expire at the remote UE, which may cause added latency in the RRC connection procedure. Aspects presented herein provide for a base station and/or relay UE to provide a remote UE with timers for application in connection with RRC connection procedures (e.g., RRC connection establishment, RRC connection resume, and/or RRC connection reestablishment) with the base station via a relay UE. The relay UE may further provide information to the remote UE about the relay UE' s RRC connection status with the base station. In some aspects, the timer(s) may be associated with an RRC connection status of the relay UE. For example, a first timer may be associated with an RRC procedure with the base station via a relay UE in an RRC connected state, and a second timer may be associated with an RRC procedure with the base station via a relay UE in an RRC idle state or an RRC inactive state.

Through use of the timer(s) and/or information about the RRC connection status of the relay UE when performing an RRC connection procedure with a base station via the relay UE, the remote UE may be more likely to successfully establish/resume/reestablish an RRC connection with the base station before a timer expires, which may reduce latency of the RRC connection procedure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. TAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 4. Although the following description, including the example slot structure of FIG. 4, may provide examples for sidelink communication in connection with 5G NR, the concepts described herein may be applicable to other similar areas, such as LTE, LTE-A, CDMA, GSM, and other wireless technologies.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies.

Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/ UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), a network entity, or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be a remote UE that communicates with a base station 102 or 180 via a relay UE. The UE 104 may include an RRC timer component 198 that may be configured to receive an indication of one or more timer for RRC connection with a base station via a relay UE, transmit a request associated with an RRC connection to the relay UE for relay to the base station, and monitor for a response from the base station based on the one or more timer for the RRC connection via the relay UE. Another UE 104 may be the relay UE that is configured to relay communication between the base station 102 or 180 and the UE 104. The UE 104 may include an additional timer component 199 that is configured to transmit a sidelink message indicating one or more timer for a RRC connection procedure of a remote UE with a base station via a relay UE, the one or more timer including additional amount of time for the RRC connection procedure via the relay UE. The relay UE may then receive a request associated with an RRC connection from the remote UE for relay to the base station. A base station 102 or 180 may include a timer information component 113 that is configured to transmit system information indicating one or more timer for RRC connection of a remote UE via a relay UE; and receive a request associated with an RRC connection from the remote UE via the relay UE for relay to the base station.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>Δf = 2^μ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $^\mu$ slots/subframe. The subcarrier spacing may be equal to $2^{\mu} * 15$ kHz, where μ is the numerology 0 to 4. As such, the numerology μ0 has a subcarrier spacing of 15 kHz and the numerology μ4 has a subcarrier spacing of 240 kHz. The symbol length/duration is inversely related to the subcarrier spacing. FIGS. 2A-2D provide an example of normal CP with 14 symbols per slot and numerology μ2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame.

The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals 2107819W01C1 20 (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (B SR), a power headroom report (PHR), and/or UCI.

Figure 3:
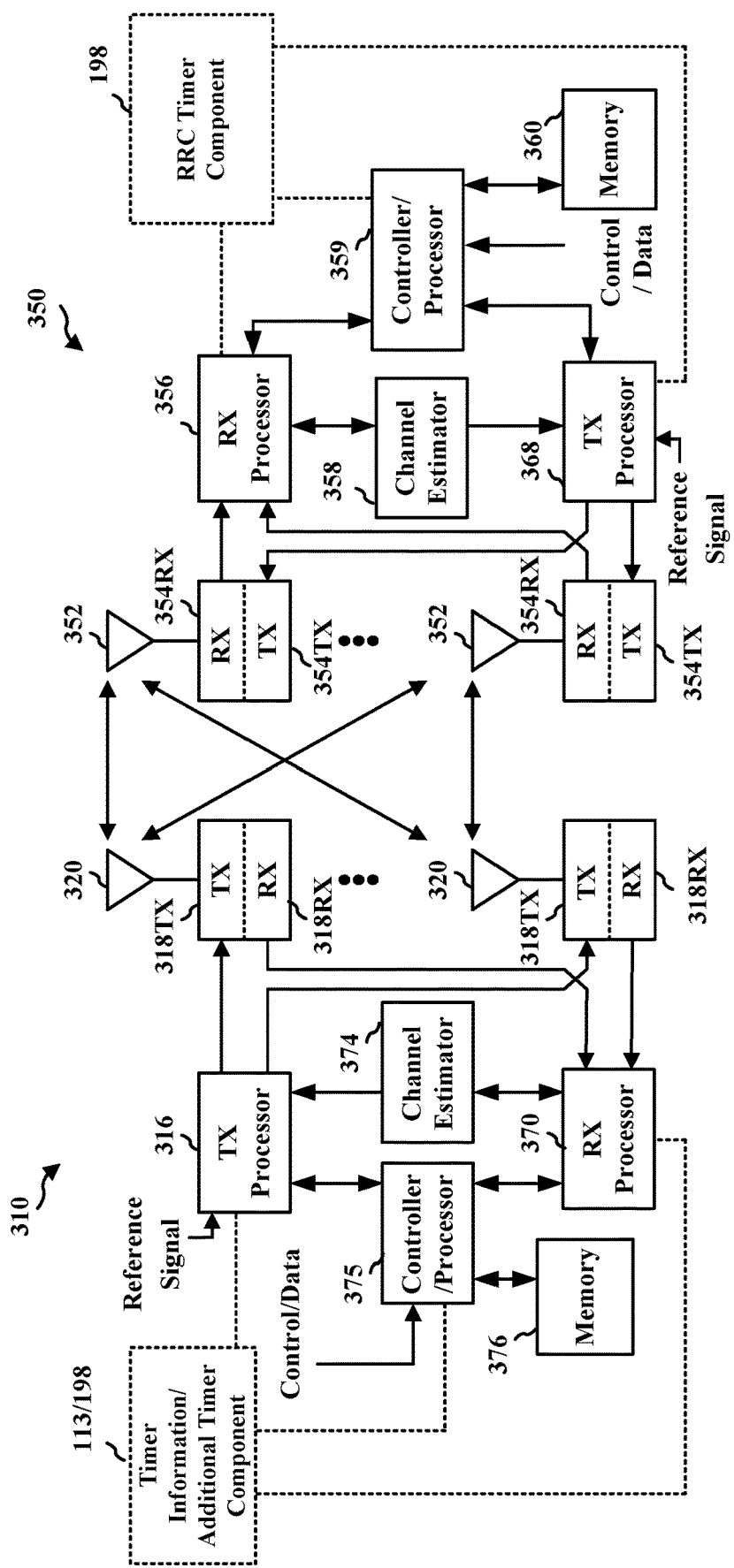
FIG. 3 is a diagram illustrating an example of a base station and user equipment (UE) in an access network.

FIG. 3 is a block diagram of a first wireless communication device 310 in communication with a second wireless communication device 350. In some examples, the devices 310 and 350 may communicate based on sidelink, e.g., and may use a PC5 interface. The devices 310 and 350 may correspond to UEs, in some aspects. In other examples, the device 310 may be a base station 102 and the device 350 may be a UE 104. The communication between the devices may be over an access link, e.g., based on a Uu interface. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The controller/processor 375 may provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate a radio frequency (RF) carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the device 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the device 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the RRC timer component 198 of FIG. 1.

At least one of the TX processor 316, the RX processor 370, and the controller/processor 375 may be configured to perform aspects in connection with the additional timer component 199, or the timer information component 113 of FIG. 1.

Figure 4:
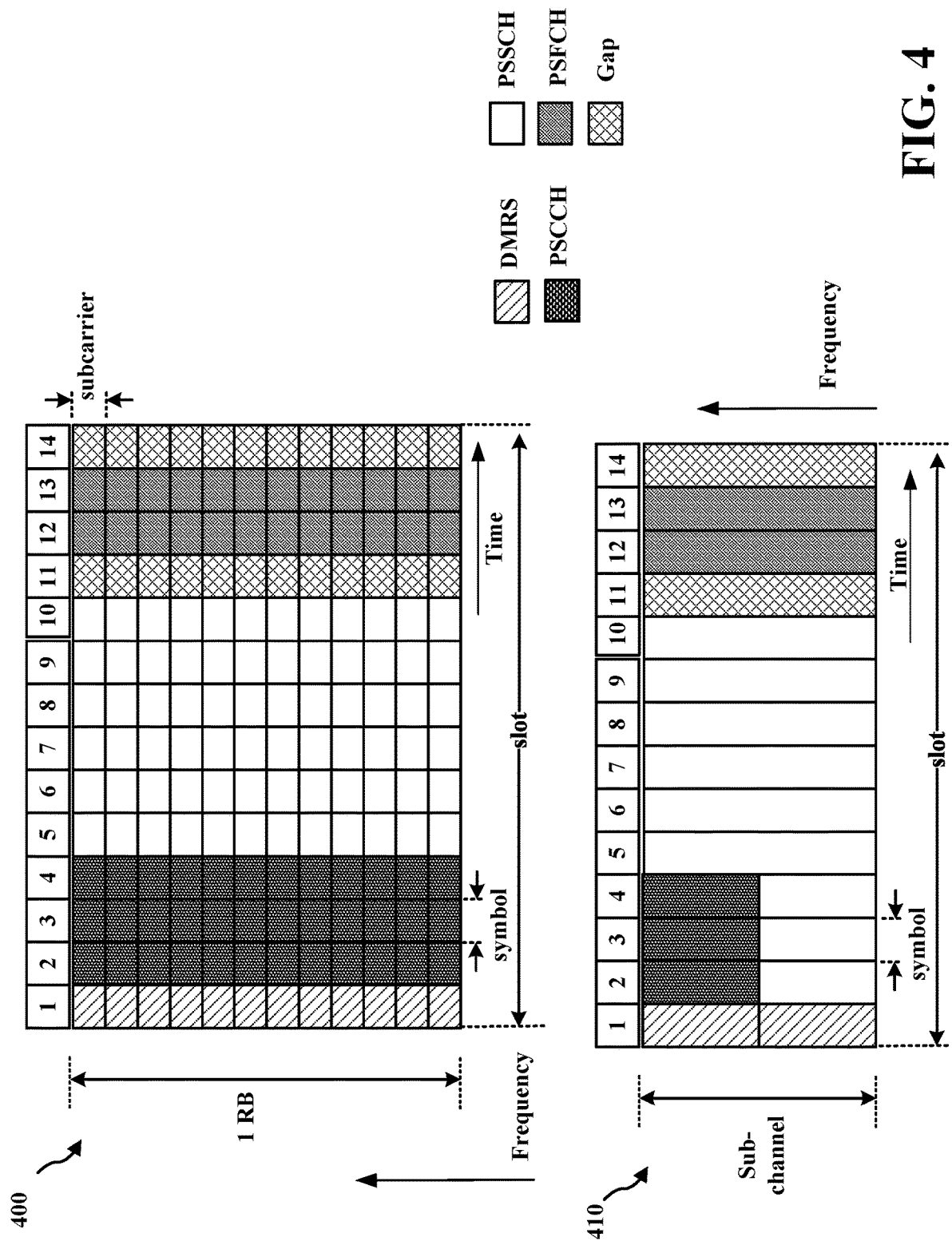
FIG. 4 illustrates example aspects of a sidelink slot structure.

FIG. 4 includes diagrams 400 and 410 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 4 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 410 in FIG. 4 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 4, some of the REs may include control information in PSCCH and some REs may include demodulation RS (DMRS). At least one symbol may be used for feedback. FIG. 4 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 4. Multiple slots may be aggregated together in some aspects.

Some wireless communication may include the relay of communication between a UE and a wireless network. As an example, a single hop, sidelink based layer 2 (L2) or layer 3 (L3) relay may be provided between a UE and a network.

As an example, a wireless device may support communication with a network entity over a connection based on a first radio access technology (RAT) (e.g., a Uu interface) and may support communication with another wireless device over a connection based on a different RAT (e.g., a PC5 interface, a Bluetooth low energy (BLE) interface, a WiFi-D interface, a WiFi interface, or a bluetooth (BL) regular interface, etc.). In some circumstances, the wireless device may not be able to reach the network entity using the Uu interface or may determine that the Uu interface is not suitable for current traffic criteria.

Aspects presented herein enable the wireless device to establish a local connection with the second wireless device (e.g., based on the PC5 interface, the BLE interface, the WiFi-D interface, WiFi interface, the BL interface, etc.) to relay communication between the first wireless device and the network entity. The local connection between the first UE and the second UE may be considered a remote connection in the relay procedure and may be established based on a discovery procedure of the RAT of the local connection and may be managed by the second wireless device rather than the network entity. Aspects presented herein enable multiple subscriptions (e.g., of a subscription of the first wireless device and a subscription of the second wireless device) to share a single connection with the network entity. The second subscription may be hosted remotely on the first wireless device as a tethered device. Each subscription may be associated with a separate RRC instance at the CU of the network entity, e.g., a base station. Each RRC instance may be associated with a separate security context and corresponding data context.

The network entity may configure the second wireless device (which may be referred to as a relay device) with an RLC channel for one or more remote device signaling radio bearers (SRBs) and an RLC channel for one or more remote device data radio bearers (DRBs). For example, the second wireless device may act as a relay for multiple user equipment (UEs), and the network entity may configure the second wireless device with an individual RLC channel for an SRB and an individual RLC channel for a DRB for each of the UEs.

The first wireless device may provide capability information to the network entity, e.g., indicating the type of RAT of the local connection between the first wireless device and the second wireless device and/or indicating a type of relay that the first wireless device supports. For example, the first wireless device may indicate whether it supports an L2 relay or L3 relay.

Figure 7:
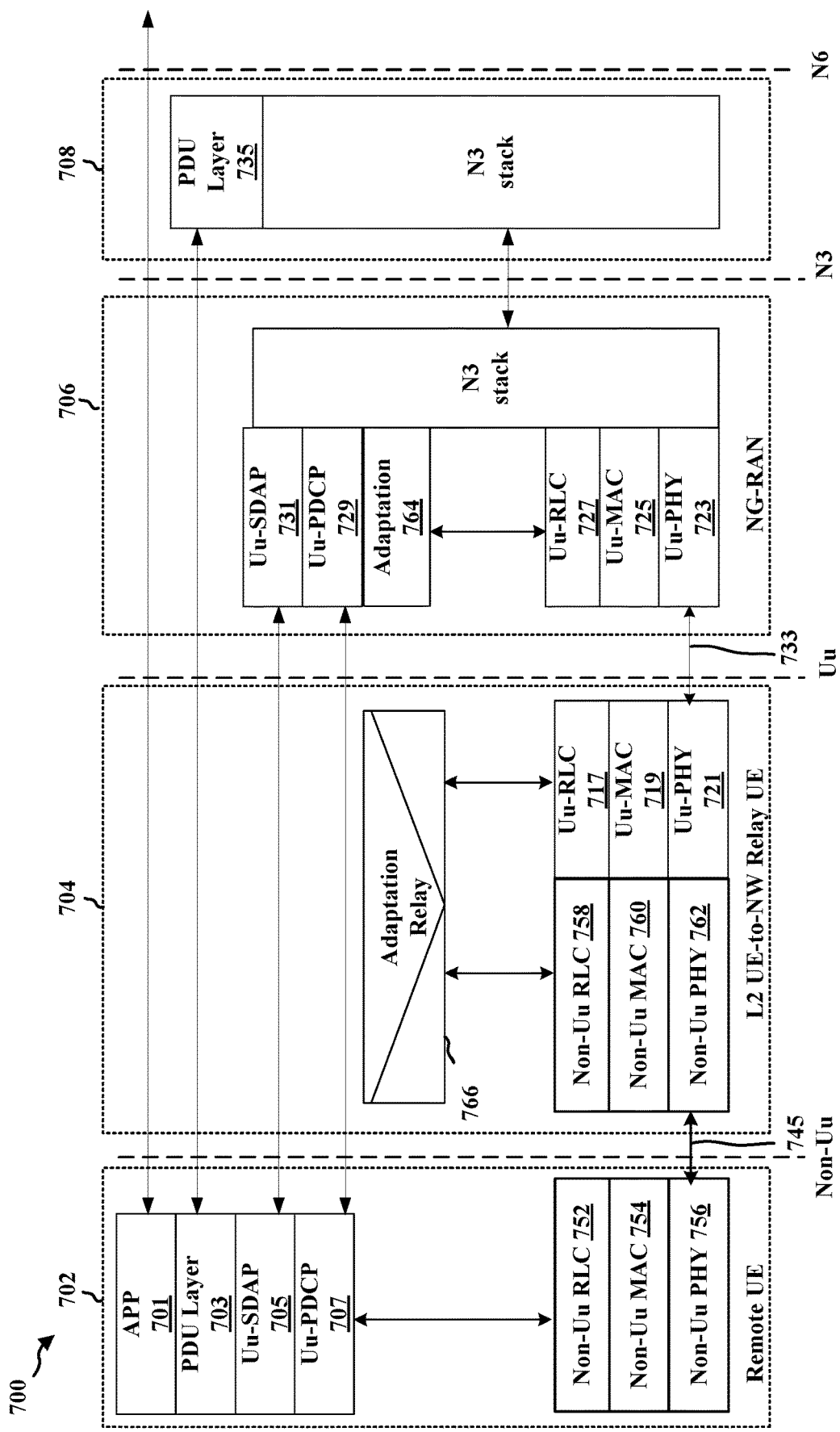
FIG. 7 illustrates an example protocol stack for a L2 relay.

A wireless device may support communication with a network entity over a connection based on a first RAT (e.g., a Uu interface) and may support communication with another wireless device over a connection based on a different RAT (e.g., a sidelink interface, a BLE interface, a WiFi-D interface, a WiFi interface, or a BL regular interface, etc.). As an example, FIG. 7 illustrates a protocol stack for a UE 704 that supports a connection with a network over a Uu interface and with a second UE (e.g., UE 702) over a non-Uu interface. Additionally, FIG. 1 illustrates various examples of UEs (e.g., including the UE comprising the timer component 199) that support an access link or Uu link (e.g., 120) with a base station 102 or 180 and a sidelink (e.g., 158) with another UE 104. In some aspects, the wireless device may be another UE having a reduced capability. In non-limiting examples, the wireless device may be a wearable, a sensor, etc., which may have the capability to establish a Uu connection with a network. In some aspects, the wireless device may not be able to reach the network entity using the Uu interface or may determine that the Uu interface is not suitable for current traffic criteria. In some aspects, the suitability may be based on a quality of a Uu connection, e.g., the Uu interface may be determined to be suitable or not suitable for current traffic based on a quality metric, in some aspects. As an example, the wireless device may move to a location with reduced coverage by the network. The wireless device may establish a local connection with a second wireless device. As an example, a UE may establish a sidelink connection with a second UE to relay communication between the wireless device and the network entity, e.g., a base station.

The local connection may be referred to as a remote connection for the relay procedure that is established based on a discovery procedure of the RAT. The local connection may be managed by the second wireless device or the first wireless device itself rather than the network entity. Aspects presented herein enable multiple subscriptions (e.g., a subscription of the multiple UEs) to share a single connection with the network entity. The second subscription may be hosted remotely on the remote UE as a tethered device, e.g., that is tethered to the relay UE using the local RAT, e.g., as illustrated in for the protocol stack in FIG. 7. Each subscription may be associated with a separate RRC instance at a network entity, e.g., a base station. Each RRC instance may be associated with a separate security context (e.g., an access stratum (AS) context and a non-access stratum (NAS) context). Each RRC instance may be associated with a separate control plane context at central unit control plane (CU-CP) and a user plane context at central unit user plane (CU-UP). The separate RRC instances may help the network to distinguish between the subscription of the relay UE and the remote device UE.

Figure 5:
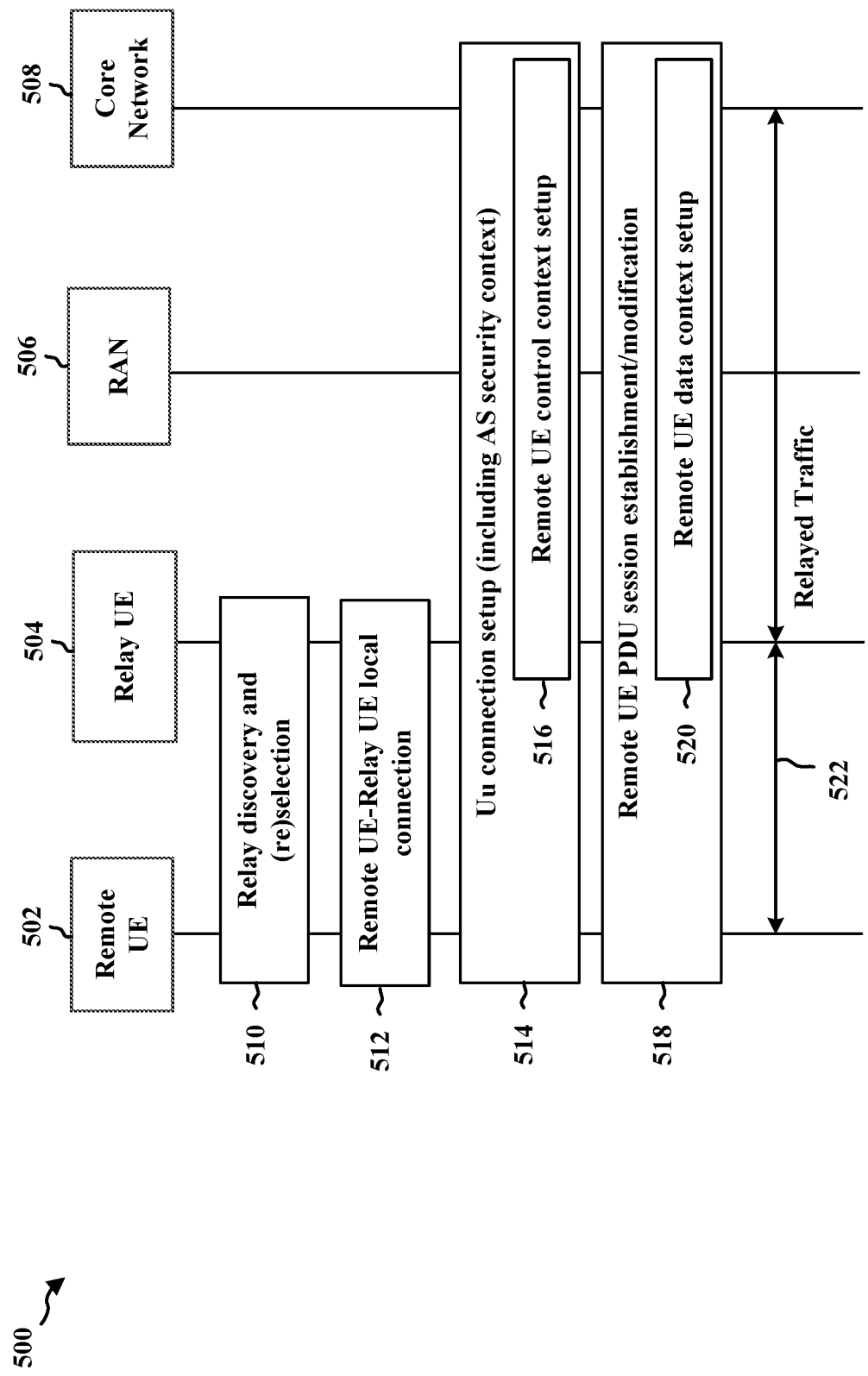
FIG. 5 illustrates a communication flow between a remote UE, a relay UE, and a network.

FIG. 5 illustrates an example communication flow 500 between a remote UE 502, a relay UE 504, a RAN 506, and a core network 508 to establish a connection between the remote UE 502 and the network (e.g., the RAN 506 and/or core network 508). The remote UE 502 may correspond to the remote device. The relay UE 504 may correspond to the relay UE 104. At 510, the remote UE 502 and relay UE 504 discovery each other using a discovery procedure based on a locate RAT (e.g., PC5, WiFi, BLE, BL, etc.). Although illustrated as a single step, there may be multiple steps involved in the discovery or reselection procedure 510. For example, the remote UE 502 may discover one or more relay UEs within a range of the remote UE 502. The remote UE 502 may discover the remote UE 502 based on a discovery message transmitted by the remote UE 502. In some examples, the remote UE may advertise a capability to provide a relay service, e.g., support for L2 relay and/or L3 relay. In some aspects, an L2 relay may be referred to as a remote connection. The second type of L2 relay may be controlled or managed locally, e.g., by the relay UE and/or the wireless device. For example, the connection between the remote UE 502 and the relay UE 504 may be managed by the remote UE 502 and the relay UE 504 without configuration by a network (e.g., RAN 506 or core network 508). The remote UE 502 and/or the relay UE 504 may provide additional information in the discovery process.

At 512, after discovering the relay UE 504, the remote UE 502 and the remote UE may establish a local connection (e.g., a PC5, WiFi, BLE, BL, or other non-Uu connection). The relay UE 504 and the remote UE 502 may establish the connection, at 512, without control from the RAN 506, e.g., using a local RAT connection setup procedure.

At 514, the remote UE establishes one or more of an AS connection with a network entity (e.g., RAN 506 or core network 508) via the relay UE 504. The remote UE 502 sends communication for the connection setup to the relay UE 504 that the relay UE 504 transmits the communication to the network. The network sends the connection setup communication for the remote UE 502 to the relay UE 504. The network configures, at the relay UE 504, a control context setup for the remote UE, at 516. At 518, the network establishes or modifies a PDU session for the remote UE 502, including configuring, at the relay UE 504, a data context set up for the remote UE, at 520.

Thus, the remote UE establishes an AS connection, NAS connection, and PDU session(s) with the network (e.g., the RAN 506 and/or core network 508) via the relay UE 504 using the local connection established at 512. The network configures the remote UE control and data context (e.g., for Uu control and data) at the relay UE 504.

Then, the remote UE 502 and the network (e.g., RAN 506 or core network 508) may exchange traffic 522 via the relay UE 504 for the PDU session configured for the remote UE 502.

The remote UE may determine to connect to a relay UE for various reasons. In some examples, the remote UE 502 may determine that the network is not reachable with a direct Uu connection. In other examples, the remote UE 502 may be capable of establishing a Uu connection with the network yet may determine that the direct connection between the remote UE and the network is not suitable for a particular type of traffic that the remote UE will exchange with the network. In response, the remote UE 502 may then search for, or attempt to discover, a relay UE 504 capable of providing a remote connection relay service for the wireless device (e.g., remote UE 502).

After selecting the relay UE 504 and establishing the connection, at 512, the remote UE may continue to monitor reselection criteria based on the local RAT selection procedure. For example, the remote UE 502 and/or the relay UE 504 may be mobile, and the coverage that the relay UE 504 provides under the local RAT may vary. At times, the remote UE 502 may discover a different relay UE 504 that meets the reselection criteria for the local RAT and may reselect to the other relay UE 504.

FIG. 5 illustrates the relay UE 504 providing a single hop to the network for the tethered connection with the remote UE 502. Although FIG. 5 illustrates a single remote UE 502, in some examples, the relay UE 504 may provide a relay service to multiple remote devices over the local RAT. In some examples, the relay UE may support up to a particular number of remote UEs. The relay UE 504 may support a dedicated Uu radio link control (RLC) channel for each remote UE. The relay UE and the base station (e.g., RAN 506) may support the relaying to the remote UE 502 without an adaptation layer, in some aspects. The relay UE may use a one-to-one mapping between the Uu RLC channel configured for the remote UE at the relay UE and the local RAT connection to the remote UE. For example, the relay UE 504 may relay traffic from the base station to the remote UE without identifiers for bearer mapping. The remote UE data may be sent over Uu signaling radio bearers (SRBs) and data radio bearers (DRBs). On the local link between the remote UE 502 and the relay UE 504, the relay UE 504 may manage the local connection quality of service (QoS) and context. On the Uu link between the relay UE 504 and the network, the relaying RLC channels and QoS may be configured by the base station based on the remote UE's DRBs. The network may send the remote UE 502 user plane data after performing the connection setup, at 514 and PDU session setup, at 518.

Figure 6:
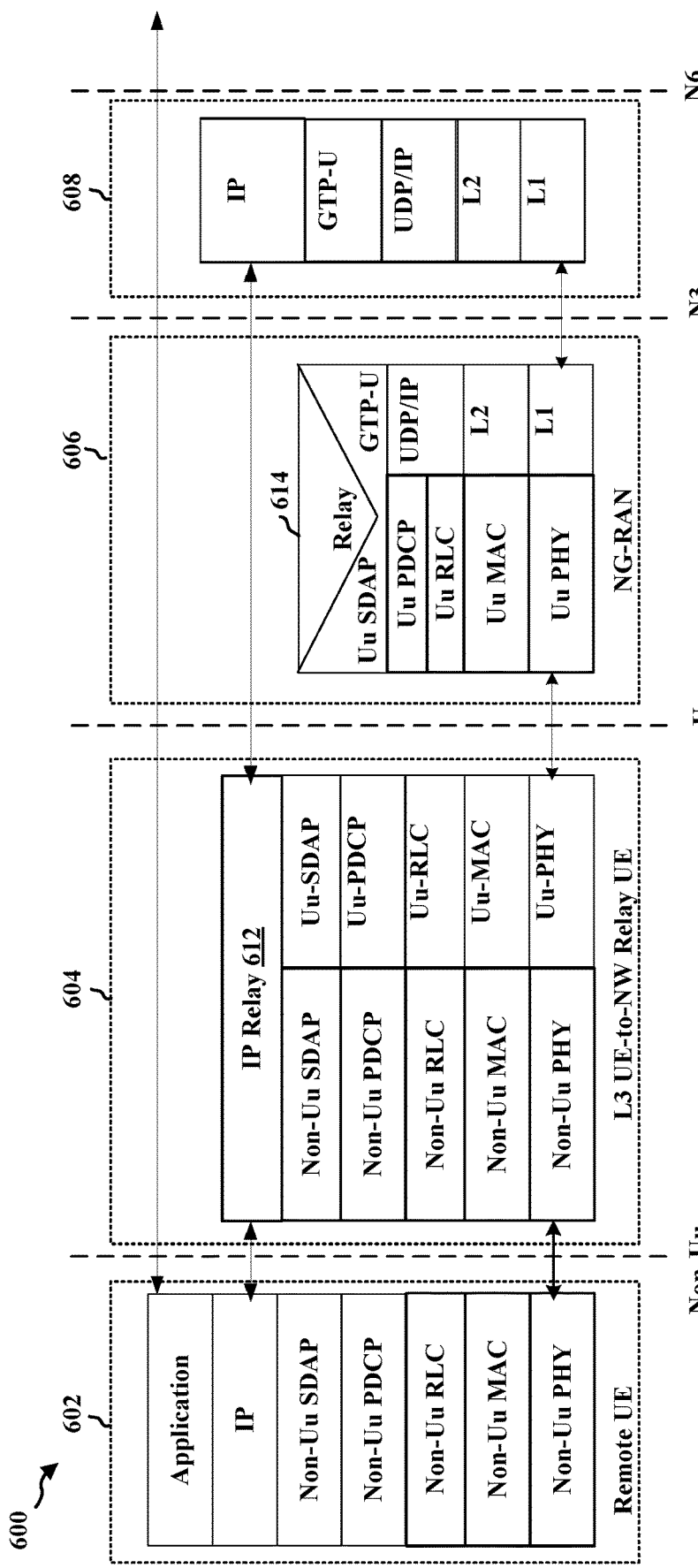
FIG. 6 illustrates an example protocol stack for a L3 relay.

FIG. 6 illustrates an example user plane protocol diagram 600 for L3 relay of communication from a remote UE 602 to a RAN 606 and network 608 via a relay UE 604. An L3 relay UE may operate as an IP router by forwarding the remote UE's traffic 522 (based on a non-Uu interface such as sidelink, e.g., PC5) to the core network using its own PDU session. The core network 608 may be a 5GC in some examples. In some aspects, local routing may be provided between the remote UE and the relay UE or between a remote UE and another remote UE. The relay of Non-IP traffic from the remote UE 502 to the network (e.g., RAN 506) may be supported through encapsulation in IP traffic or in a dedicated PDU session per remote UE. In some aspects, the Uu protocol layers may be NR protocol layers for an NR network. The aspects presented herein may be similarly applied for access links between a base station and a UE based on LTE or other RATs. The non-Uu interface may be a sidelink interface, e.g., a PC5 interface. The concepts presented herein may be applied for a connection between the remote UE and the relay UE based on other non-Uu connections such as a Bluetooth low energy (BLE), a WiFi-D, WiFi, bluetooth (BL) regular, among other examples. FIG. 6 illustrates an UP relay 612 that relays the traffic from the remote UE 602 to the network 608. The base station (e.g., 606) may include a relay 614 that passes communication from the Uu SDAP layer to a GTP-U.

In an L2 relay procedure, the relay UE may perform the relay below the PDCP layer. FIG. 7 illustrates an example user plane stack 700 for L2 relaying of wireless traffic between a remote UE 702 and a base station 706/network 708 via a relay UE 704. The relay UE 704 forwards non-Uu bearer (e.g., a sidelink bearer such as a PC5 bearer) and a Uu bearer using an adaptation layer function, e.g., at the adaptation layer 766, and the base station 706 may include a corresponding adaptation layer 764. The remote UE's DRBs may be controlled by the base station 706, e.g., RAN. The traffic terminates at the core network 708, which may be a 5GC in some examples. In some aspects, the traffic terminates at the core network 708 without direct communication between the remote UEs or to the relay. In some L2 relay architectures, the L2 relay may be based on a non-Uu link, e.g., a sidelink such as PC5 link, may be managed locally by the remote UE or relay UE rather than by the network. The type of L2 relay may be referred to as L2 light relay. In such aspects, UE controlled mobility may be supported.

The APP layer 701, the PDU layer 703, the SDAP layer 705, and the PDCP layer 707 terminate at the remote UE 702 and at the network side with SDAP 731, PDCP 729, and PDU layer 735. In some aspects, the Uu protocol layers may be NR protocol layers for an NR network. The aspects presented herein may be similarly applied for access links between a base station and a UE based on LTE or other RATs. The non-Uu interface may be a sidelink interface, e.g., a PC5 interface. The concepts presented herein may be applied for a connection between the remote UE and the relay UE based on other non-Uu connections such as a Bluetooth low energy (BLE), a WiFi-D, WiFi, bluetooth (BL) regular, among other examples. The data traffic passes over the local RAT, e.g., the non-Uu interface, between the remote UE 702 and the relay UE 704, e.g., via the non-Uu RLC layer 752, the non-Uu MAC layer 754, and the non-Uu physical (PHY) layer 756 that exchanges communication with the non-Uu PHY layer 762 of the relay UE 704. The non-Uu PHY layer 762 passes the communication from the remote UE 702 to the MAC layer 760.

The non-Uu L2 758 provides the communication to an RLC 717 for a different RAT than the local connection, e.g., a Uu connection, such as an NR Uu connection via the adaptation layer 766. The RLC layer (e.g., 717) passes the communication to a MAC layer 719 for the Uu connection, which provides the communication to a PHY layer 721 for the Uu connection. The communication is exchanged over a Uu interface between the PHY layer 721 of the relay UE 704 and the PHY layer 723 of the network (e.g., 706), where it is processed by the NR-MAC layer 725 and NR-RLC 727.

As illustrated by the arrows in FIG. 7, messages may be sent from the network (e.g., 706) for the remote UE 702 via the relay UE 704 or may be sent from the remote UE 702 to the network (e.g., 706) via the relay UE 704. Although FIG. 7 illustrates the stack for a single remote UE 702, the relay UE 704 may have a unique Uu channel 733 for each remote UE that it supports. For each message for the unique Uu connection (e.g., 733) for a remote UE 702, the relay UE 704 relays the data at the L2 layer to the non-Uu connection 745.

The network entity may configure the relay UE 704 with a RLC channel for one or more remote device signaling radio bearers (SRBs) and an RLC channel for one or more remote device data radio bearers (DRBs). For example, the relay UE may act as a relay for multiple remote UEs, and the network may configure the relay UE with an individual RLC channel for an SRB and an individual RLC channel for a DRB for each of the UEs.

Figure 8:
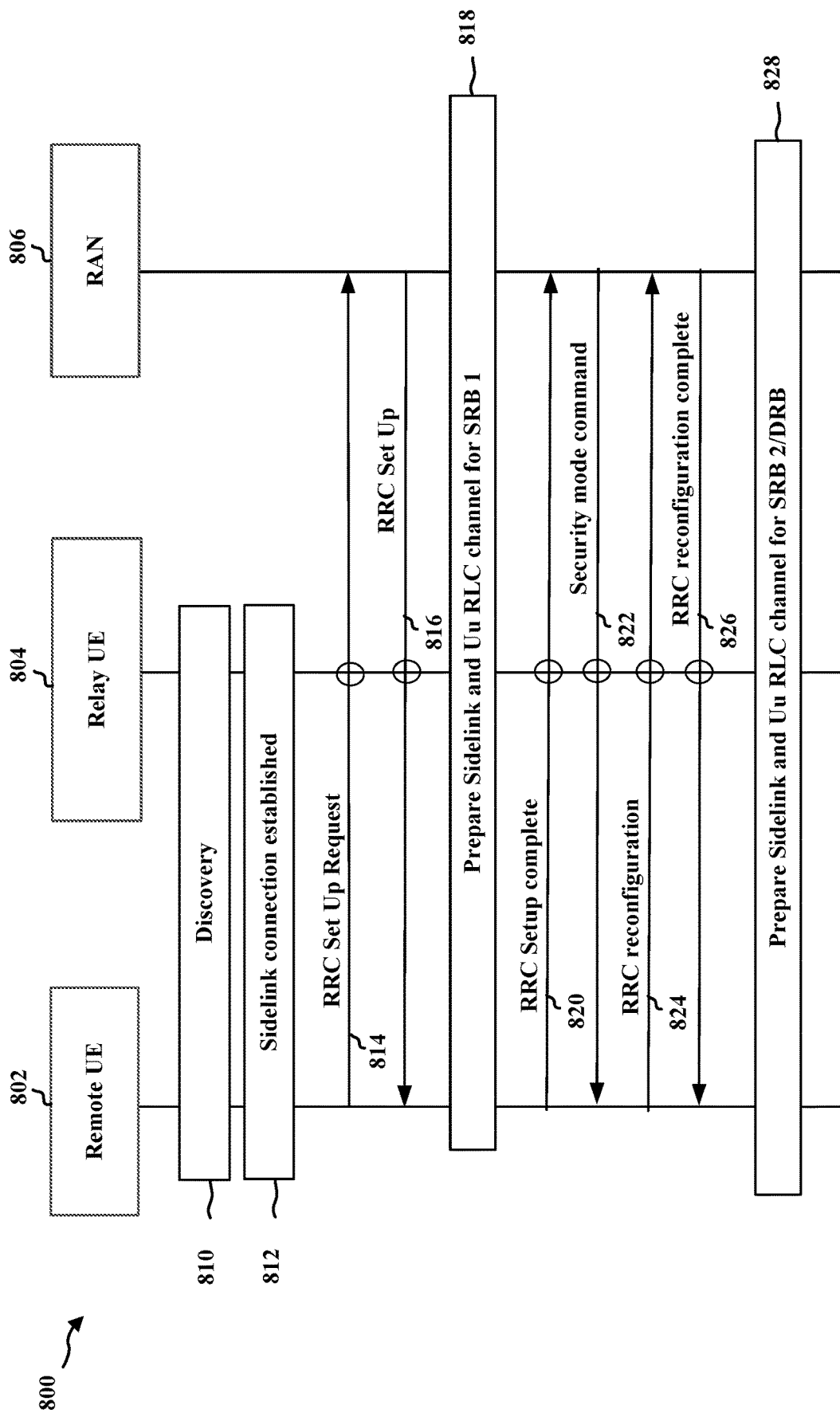
FIG. 8 illustrates a communication flow between a remote UE, a relay UE, and a network.

FIG. 8 illustrates a communication flow 800 showing an RRC establishment procedure for a remote UE 802 with a base station 806 via a relay UE 804. The remote UE 802 may establish its own PDU sessions/DRBs with the network before user plane data transmission.

At 810, the remote UE 802 and relay UE 804 discovery each other using a discovery procedure based on a local RAT, such as sidelink. The sidelink discovery procedure may include the exchange of one or more sidelink messages between the UE 802 and the relay UE 804. Although illustrated as a single step, there may be multiple steps involved in the discovery or reselection procedure 810. For example, the remote UE 802 may discover one or more relay UEs within a range of the remote UE 802. The remote UE 802 may discovery the remote UE 802 based on a discovery message transmitted by the remote UE 802. The discovery at 810 may include any of the aspects described in connection with 510 in FIG. 5.

At 812, after discovery, the remote UE 802 and the relay UE 804 may establish a local connection, e.g., based on sidelink. The establishment of the local connection may include the exchange of one or more sidelink messages between the UE 802 and the UE 804.

At 814, the Remote UE sends the first RRC message (i.e., RRCSetupRequest) for its connection establishment with the base station 806 via the relay UE 804. The remote UE 802 may use a default L2 configuration on sidelink, e.g., PC5, in some aspects. The base station 806 responds with an RRCSetup message 816 to the remote UE 802. The RRC-Setup delivery to the remote UE 802 may use a default sidelink configuration, e.g., on PC5.

The base station 806 and the relay UE 804 perform a relaying channel setup procedure over Uu. According to the configuration from base station 906, the relay UE 804 and the remote UE 802 establish an RLC channel for relaying of SRB1 towards the remote UE 802 over PC5, e.g., at 818. This may include the relaying channel for SRB1.

The remote UE SRB1 message 820 (e.g., an RRCSetupComplete message) is sent to the base station 806 via the relay UE 804 using SRB1 relaying channel over sidelink, e.g., PC5. Then the remote UE 802 is RRC connected over Uu. The remote UE 802 and base station 806 establish security, at 822, and the security messages are forwarded through the Relay UE.

The base station may set up additional RLC channels between the base station 806 and the relay UE 904 for traffic relaying. According to the configuration from the base station 806, the relay UE 804 and the remote UE 802 set up additional RLC channels between the remote UE and relay UE for traffic relaying. The base station may send an RRCReconfiguration message 824 to the remote UE via the relay UE, to set up the relaying SRB2/DRBs. The remote UE 802 may transmit an RRCReconfigurationComplete 826 message to the base station 806 via the relay UE 804 as a response. As illustrated at 828, the sidelink and Uu RLC channel is prepared for SRB 2/DRB.

Figure 9:
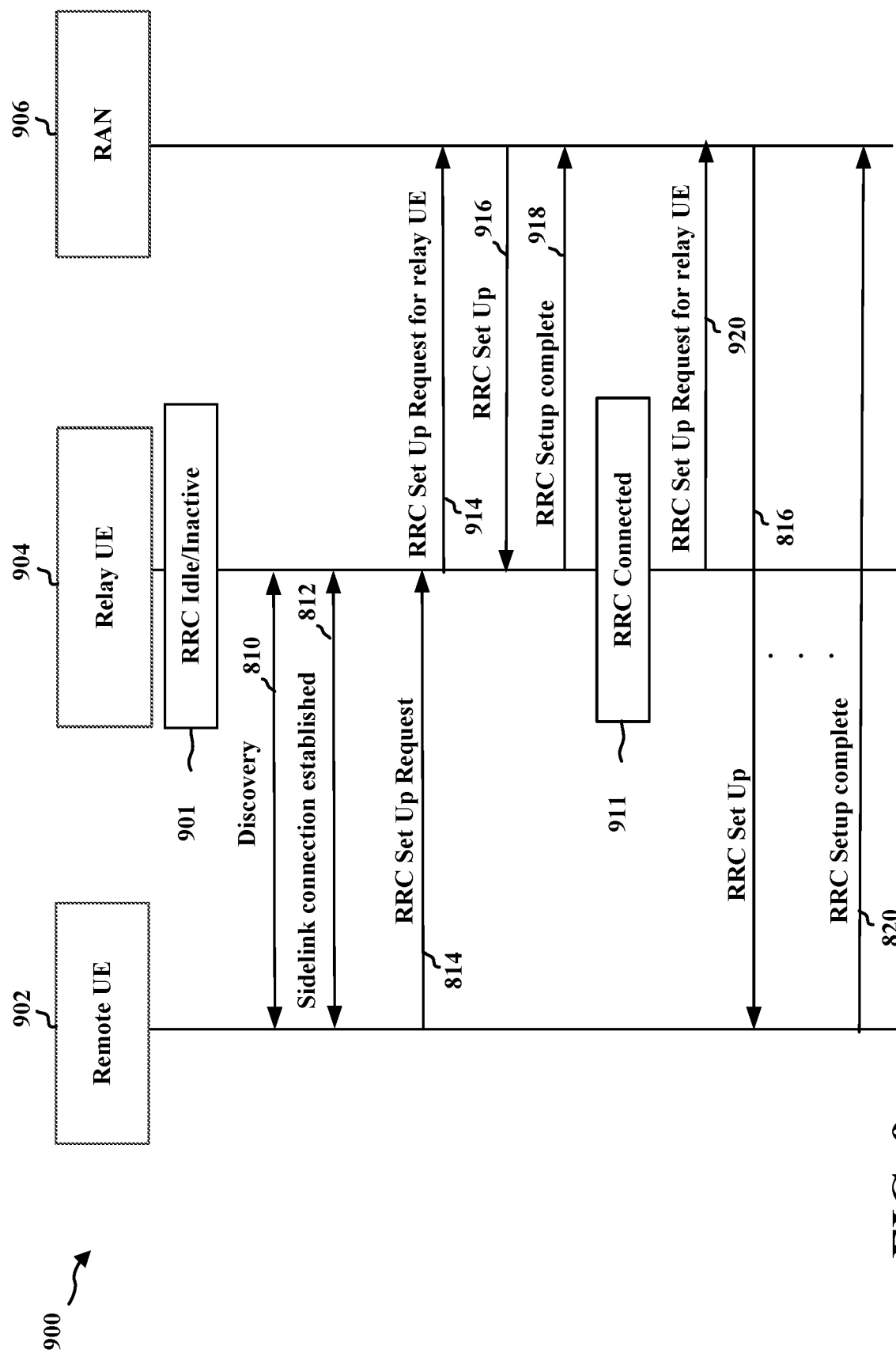
FIG. 9 illustrates a communication flow between a remote UE, a relay UE, and a network.

If the relay UE 804 did not start in an RRC connected state, e.g., RRC_CONNECTED, the relay UE 804 would perform its own connection establishment upon reception of a message on the default L2 configuration on PC5. FIG. 9 illustrates an example communication flow 900 in which the relay UE 904 is in an RRC idle or RRC inactive state, at 901, when the relay UE 904 receives the RRC set up request from the remote UE 902 to establish, resume, or re-establish an RRC connection with the base station 906. The aspects that are similar to FIG. 8 are shown with the same reference number as in FIG. 8. FIG. 9 illustrates that the relay UE 904 responds to the RRC set up request by transmitting its own RRC set up request 914 to resume or re-establish an RRC connection between the relay UE 904 and the base station 906. The relay UE 904 receives an RRC set up message 916 and transmits an RRC set up complete message 918. After the signalling, the relay UE 904 is in an RRC connected state 911 and relays the RRC set up request 814 for the remote UE 902, e.g., at 920 based on the RRC set up request 814.

The use of unified access control barring, e.g., with a T302 timer running, may lead to latency for RRC establishment. For example, upon receiving an RRC connection reject message while performing an RRC connection establishment or resume or upon reception of an RRC release message with a wait time, the UE may start a T302 timer having a value set to a wait time. The UE may wait to send another RRC connection request until the T302 timer expires. The T302 timer may be stopped if the UE completes cell reselection. The T302 timer may be stopped upon entering an RRC connected state or RRC idle state.

Another timer that a UE may use in association with RRC connection is a T300 timer.

The UE may start the T300 timer upon transmission of the RRC setup request message. The UE may stop the T300 timer in response to reception of RRCSetup message or RRCReject message, cell re-selection and upon abortion of connection establishment by upper layers. When the timer expires, the UE may perform a NAS recovery.

Another timer that a UE may use in association with RRC connection is a T301 timer. The UE may start the T301 timer upon transmission of the RRC reestablishment request message. The UE may stop the T301 timer in response to reception of RRCSetup message as well as when the selected cell becomes unsuitable. When the timer expires, the UE may enter an RRC idle state.

Another timer that a UE may use in association with RRC connection is a T319 timer.

The UE may start the T319 timer upon transmission of the RRCResumeRequest or RRCResumeRequest1 message. The UE may stop the T319 timer in response to reception of any of a RRCResume, RRCSetup, RRCRelease, RRCRelease with suspendConfig or RRCReject message and upon cell re-selection. When the timer expires, the UE may enter an RRC idle state.

Another timer that a UE may use in association with RRC connection is a T311 timer. The UE may start the T311 timer upon initiating an RRC connection re-establishment procedure. The UE may stop the T311 timer in response to receiving N311 consecutive in-sync indications from lower layers for the SpCell, upon receiving RRCReconfiguration with reconfigurationWithSync for that cell group, upon reception of MobilityFromNRCommand, upon the reconfiguration of rlf-TimersAndConstant, upon initiating the connection re-establishment procedure, upon conditional reconfiguration execution i.e. when applying a stored RRCReconfiguration message including reconfigurationWithSync for that cell group, and upon initiating the MCG failure information procedure. Upon expiration, the UE may go to an RRC idle state or may inform the network about a radio link failure. When the timer expires, the UE may enter an RRC idle state.

As described in connection with FIG. 9, depending on the RRC connection state of the relay UE 904, the RRC connection procedure for the remote UE 902 may take different amounts of time. A timer may expire due to the time for the relay UE 904 to establish/resume an RRC connection. Aspects presented herein provide for RRC connection timing that takes into consideration the involvement of a UE relay, and which may be based on an RRC connection state of the relay UE.

In some aspects, the base station may indicate one or more timers in system information having a larger size for RRC connection establishment via a UE relay.

Figure 10:
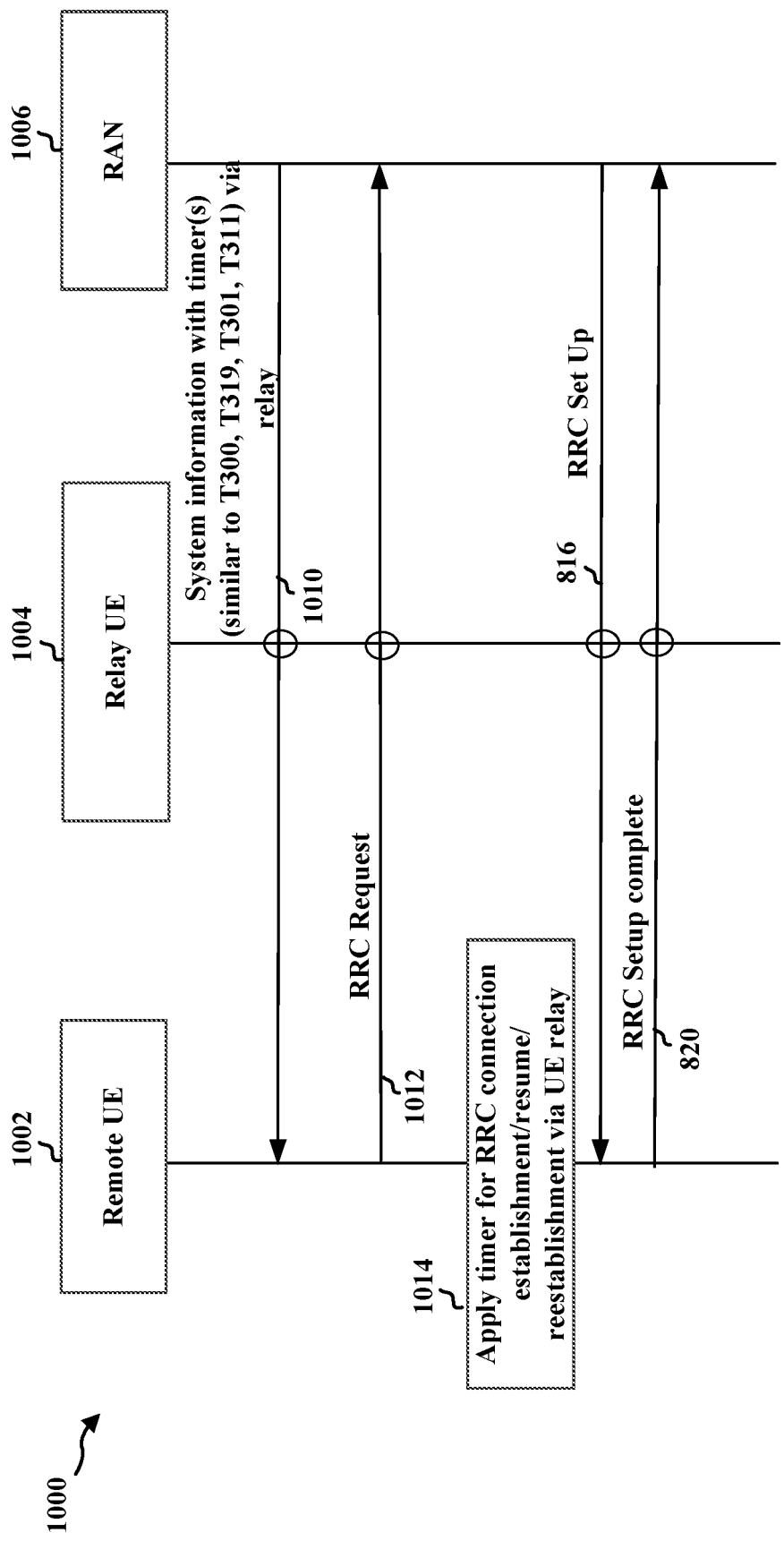
FIG. 10 illustrates a communication flow between a remote UE, a relay UE, and a network.

FIG. 10 illustrates an example communication flow 1000 between a remote UE 1002, a relay UE 1004, and a base station 1006 including the signaling and application of timers for RRC connection establishment/resume/reestablishment via a UE relay. As illustrated at 1010, the base station 1006 may provide, e.g., in broadcast system information, one or more timers for RRC connection via a UE relay. For example, the timers may be transmitted in a SIB.

As an example, the base station 1006 may provide a timer value for RRC establishment via a UE relay. The timer value may be similar to the T300 timer for RRC establishment via a UE relay. The base station 1006 may provide a timer value for RRC resume procedure via a UE relay. The timer value may be similar to the T319 timer for an RRC resume procedure via a UE relay. The base station 1006 may provide two timer values for RRC reestablishment procedure via a UE relay. The timer values may be similar to the T301 and T311 timer for an RRC reestablishment procedure via a UE relay.

The base station 1006 may also provide a T300, T319, T301, and/or T311 timer value that is not associated with communication via a UE relay, e.g., that are associated with a direct connection between a UE and the base station. The timers for direct connection may be transmitted with the timers for the connection via the UE relay, e.g., at 1010, or separately from the timers for the connection via the UE relay. The remote UE 1002, e.g., a UE that supports L2 UE-to-network relay may disregard the timers for direction connection and may determine and apply the timers for connection via the relay UE.

As illustrated, at 1012, the remote UE 1002 may transmit an RRC request, the RRC request may be a request to establish an RRC connection (e.g., an RRC setup request), a request to resume an RRC connection (e.g., an RRC resume request), or a request to reestablish an RRC connection (e.g., an RRC reestablishment or RRC set up message).

The remote UE 1002 may then apply a correspond timer from the system information 1010, e.g., based on the attempt to establish, resume, or reestablish an RRC connection with the base station 1006 via the relay UE 1004. In some aspects, the timers associated with connection via a UE relay may have different stop and start conditions that timers associated with a direct connection between a UE and the base station.

As an example, the remote UE 1002 may start a timer for RRC establishment via a relay UE (e.g., similar to T300)

upon transmission of the RRC setup request, at 1014, to the base station 1006 via the relay UE 1004. The remote UE 1002 may stop the timer upon reception of an RRC set up message 816, and RRC reject message, a cell reselection, or a relay UE reselection, or upon stopping connection establishment by upper layers. If the timer expires, the remote UE 1002 may perform a NAS recovery procedure.

As another example, the remote UE 1002 may start a timer for RRC connection resume via a relay UE (e.g., similar to T319) upon transmission of RRCResumeRequest or RRCResumeRequestl, at 1014. The remote UE 1002 may stop the timer upon reception of any of an RRCResume message, an RRC Setup message, an RRCRelease message, an RRCRelease message with suspendConfig, or an RRCReject message. The UE may also stop the timer in response to cell reselection or relay UE reselection, or upon stopping connection establishment by upper layers. When the timer expires, the remote UE 1002 may enter an RRC idle state.

As another example, the remote UE 1002 may start a timer for RRC connection reestablishment via a relay UE (e.g., similar to T301) upon transmission of an RRCReestablishmentRequest. The remote UE 1002 may stop the timer upon reception of an RRCReestablishment message or RRCSetup message, when the selected cell becomes unsuitable (e.g., does not meet a criteria or metric), or when the selected relay UE becomes unsuitable (e.g., does not meet a criteria or metric). When the timer expires, the remote UE 1002 may enter an RRC idle state.

As another example, the remote UE 1002 may start a timer for RRC connection reestablishment via a relay UE (e.g., similar to T311) upon initiating the RRC connection re-establishment procedure. The remote UE 1002 may stop the timer upon selection of a suitable cell (e.g., meeting a cell criteria or cell metric), or a suitable relay (e.g., meeting a relay criteria or metric), or a cell using another RAT. When the timer expires, the remote UE 1002 may enter an RRC idle state.

Figure 11:
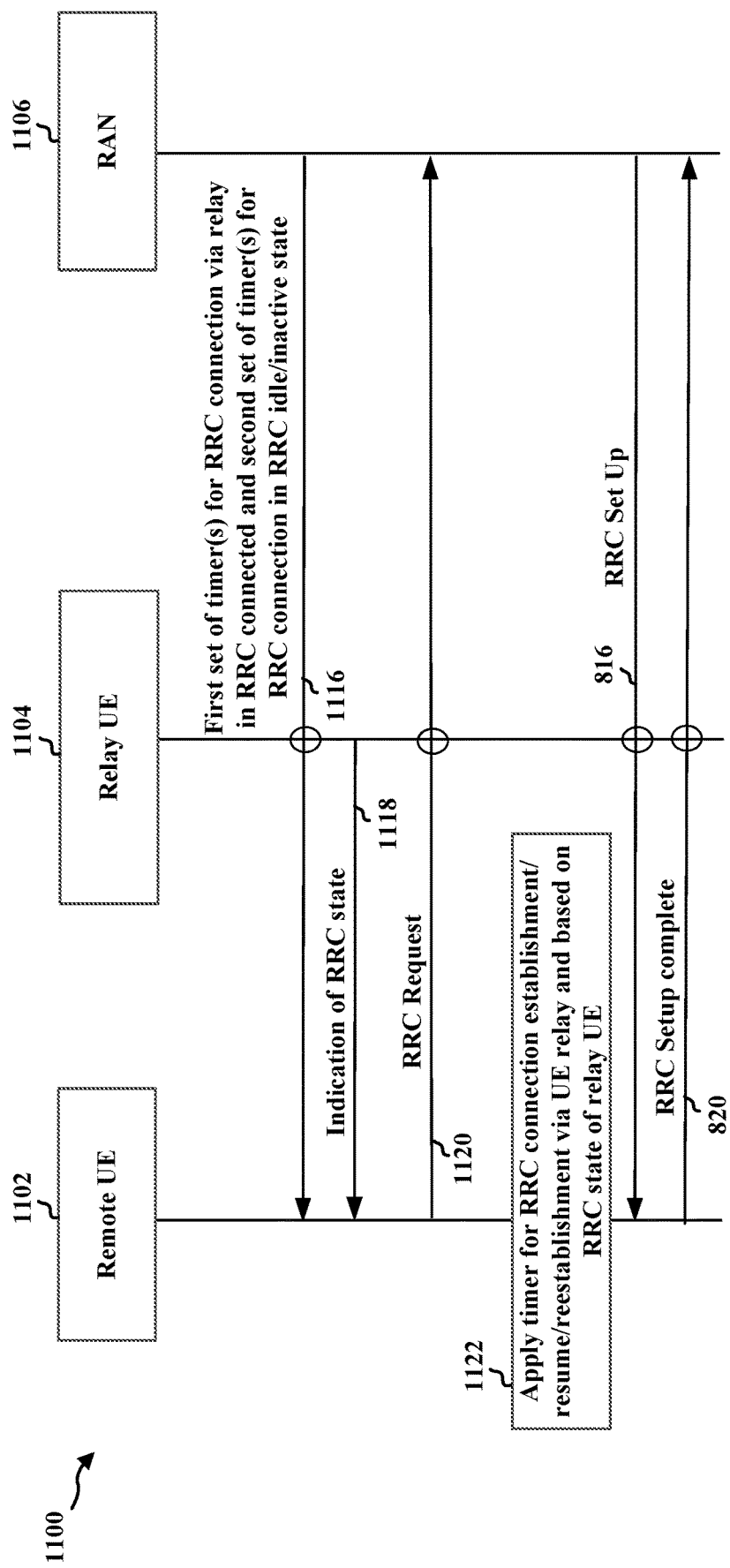
FIG. 11 illustrates a communication flow between a remote UE, a relay UE, and a network.

In some aspects, the base station may indicate multiple timer values for RRC connection procedures via a UE relay. The base station 1006 may indicate a first set of timer values for a UE relay in an RRC connected state (e.g., having an established RRC connection with the base station) and a second set of timer values for a UE relay in an RRC idle or RRC inactive state, or otherwise not in an RRC connected state. The set of timer values for RRC connection via a relay that is not in an RRC connected state may be longer than the set of timer values for RRC connection via a relay that is in an RRC connected state. FIG. 11 illustrates an example communication flow 1100 between a remote UE 1102, a relay UE 1104, and a base station 1106 including the signaling and application of timers for RRC connection establishment/resume/reestablishment via a UE relay. As illustrated at 1116, the base station 1106 may provide, e.g., in broadcast system information, one or more timers for RRC connection via a UE relay. For example, the timers may be transmitted in a SIB.

As an example, the base station 1106 may provide a first timer value for RRC establishment via a UE relay in an RRC connected state and a second timer value for RRC establishment via a UE relay in an RRC idle/inactive state. The timer values may be similar to the T300 timer for RRC establishment via a UE relay. The base station 1106 may provide a first timer value for an RRC resume procedure via a UE relay in an RRC connected state and a second timer value for an RRC resume procedure via a UE relay in an RRC idle/inactive state. The timer values may be similar to the T319 timer for an RRC resume procedure via a UE relay timer value for RRC resume procedure via a UE relay in an RRC idle/inactive state. The base station 1106 may provide two sets of timer values for RRC reestablishment procedure via a UE relay, e.g., a first set for RRC reestablishment via procedure via a UE relay in an RRC connected state and the second set of timers may be for RRC reestablishment via a UE relay in an RRC idle/inactive state. The sets of timer values may be similar to the T301 and T311 timer for an RRC reestablishment procedure via a UE relay. The base station 1006 may also provide a T300, T319, T301, and/or T311 timer value that is not associated with communication via a UE relay, e.g., that are associated with a direct connection between a UE and the base station.

The remote UE 1102, e.g., a UE that supports L2 UE-to-network relay may disregard the timers for direction connection and may determine which of the timers for connection via the relay UE to apply based on an RRC connection state of the relay UE.

As illustrated at 1118, the relay UE 1104 may transmit an indication of the RRC connection state of the relay UE to the remote UE 1102. The relay UE 1104 may transmit the indication 1118 in a sidelink discovery message, e.g., as a part of the sidelink discovery at 510 or 810. The relay UE 1104 may transmit the indication 1118 to the remote UE 1102 in a sidelink RRC message, e.g., in a dedicated message to the remote UE 1102.

As illustrated, at 1120, the remote UE 1102 may transmit an RRC request, the RRC request may be a request to establish an RRC connection (e.g., an RRC setup request), a request to resume an RRC connection (e.g., an RRC resume request), or a request to reestablish an RRC connection (e.g., an RRC reestablishment or RRC set up message). The remote UE 1102 then applies a corresponding timer based on the RRC connected state of the relay UE, at 1122.

As an example, the remote UE 1102 may start a timer for RRC establishment via a relay UE in an RRC connected state (e.g., similar to T300) upon transmission of the RRC setup request, at 1120, to the base station 1106 via the relay UE 1104 if the relay UE is in an RRC connected state. The remote UE 1102 may start a timer for RRC establishment via a relay UE in an RRC inactive/idle state (e.g., similar to T300) upon transmission of the RRC setup request, at 1120, to the base station 1106 if the relay UE 1104 is in an RRC in an idle/inactive state. The remote UE 1102 may stop the timer upon reception of an RRC set up message 816, and RRC reject message, a cell reselection, or a relay UE reselection, or upon stopping connection establishment by upper layers. If the timer expires, the remote UE 1102 may perform a NAS recovery procedure.

As another example, the remote UE 1102 may start a timer for RRC connection resume via a relay UE in an RRC connected state (e.g., similar to T319) upon transmission of RRCResumeRequest or RRCResumeRequestl, at 1120, if the relay UE 1104 is in an RRC connected state. The remote UE 1102 may start a timer for RRC connection resume via a relay UE in an RRC inactive/idle state (e.g., similar to T319) upon transmission of RRCResumeRequest or RRCResumeRequest1, at 1120, if the relay UE 1104 is in an RRC idle/inactive state. The remote UE 1102 may stop the timer upon reception of any of an RRCResume message, an RRCSetup message, an RRCRelease message, an RRCRelease message with suspendConfig, or an RRCReject message. The remote UE 1102 may also stop the timer in response to cell reselection or relay UE reselection, or upon stopping connection establishment by upper layers. When the timer expires, the remote UE 1102 may enter an RRC idle state.

As another example, the remote UE 1102 may start a timer for RRC connection reestablishment via a relay UE in an RRC connected state (e.g., similar to T301) upon transmission of an RRCReestablishmentRequest if the relay UE 1104 is in an RRC connected state. The remote UE 1102 may start a timer for RRC connection reestablishment via a relay UE in an RRC inactive/idle state (e.g., similar to T301) upon transmission of an RRCReestablishmentRequest if the relay UE 1104 is in an RRC inactive/idle state. The remote UE 1102 may stop the timer upon reception of an RRCReestablishment message or RRCSetup message, when the selected cell becomes unsuitable (e.g., does not meet a criteria or metric), or when the selected relay UE becomes unsuitable (e.g., does not meet a criteria or metric). When the timer expires, the remote UE 1102 may enter an RRC idle state.

As another example, the remote UE 1102 may start a timer for RRC connection reestablishment via a relay UE in an RRC connected state (e.g., similar to T311) upon initiating the RRC connection re-establishment procedure, if the relay UE 1104 is in an RRC connected state. If the relay UE 1104 is in an RRC idle/inactive state, the remote UE 1102 may start a timer for RRC connection reestablishment via a relay UE in an RRC idle/inactive state (e.g., similar to T311). The remote UE 1102 may stop the timer upon selection of a suitable cell (e.g., meeting a cell criteria or cell metric), or a suitable relay (e.g., meeting a relay criteria or metric), or a cell using another RAT. When the timer expires, the remote UE 1102 may enter an RRC idle state.

Figure 12:
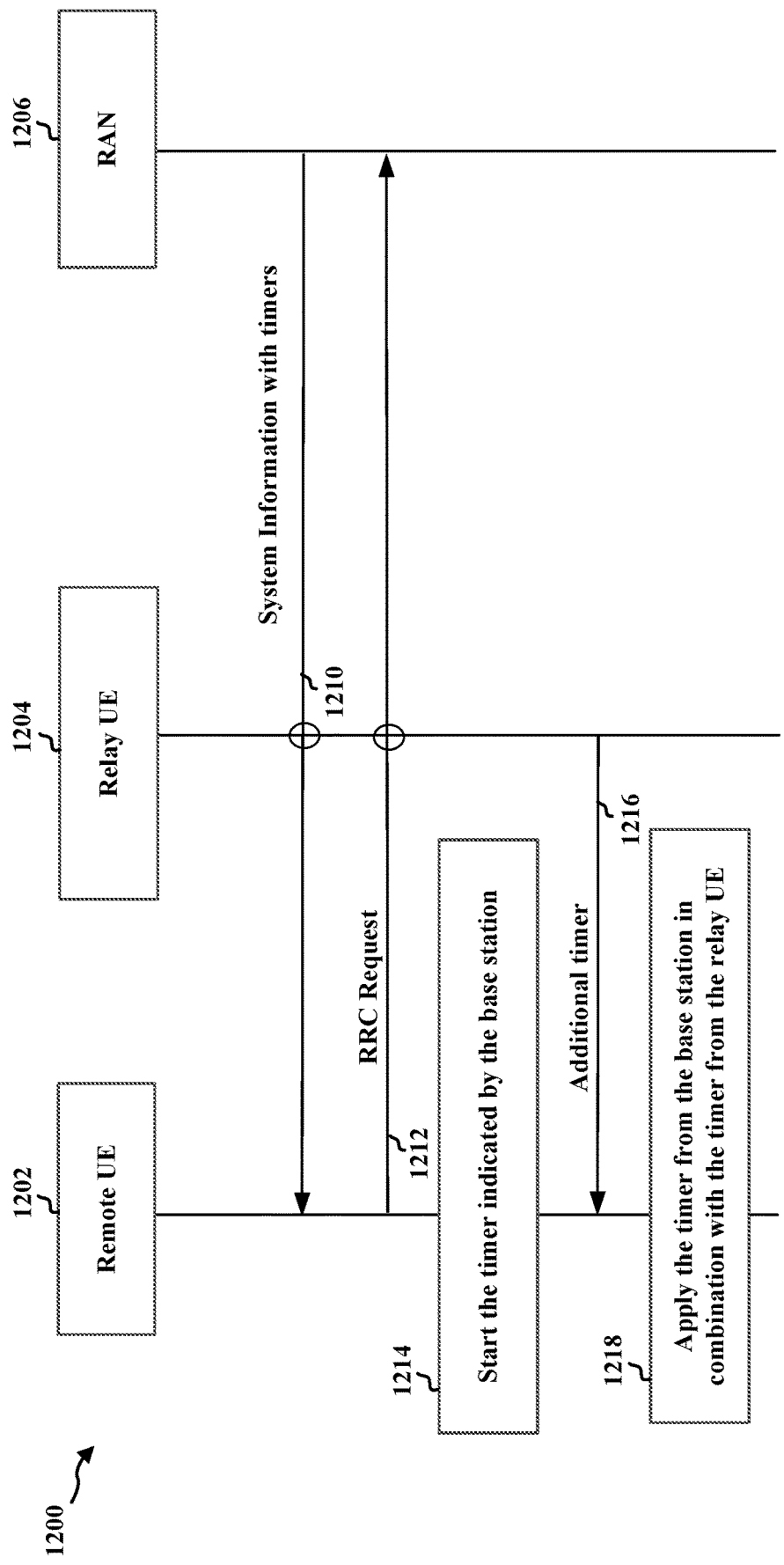
FIG. 12 illustrates a communication flow between a remote UE, a relay UE, and a network.

In some aspects, the UE may receive an additional timer from the relay UE. In some aspects, the additional timer may be based on the RRC state of the relay UE. FIG. 12 illustrates an example communication flow 1200 between a remote UE 1202, a relay UE 1204, and a base station 1206 including the signaling and application of timers for RRC connection establishment/resume/reestablishment via a UE relay. As illustrated at 1210, the base station 1206 may provide, e.g., in broadcast system information, one or more timers for RRC connection. In some aspects, the timers may be for RRC connection via a relay, e.g., as described in connection with FIG. 10. In other examples, the timers may be for RRC connection independent of the use of a relay UE. For example, the timers may be transmitted in a SIB. The timers may include a T300, T319, T301, and/or T311 timer, or may include a similar timer for RRC connection establishment/resume/reestablishment via a relay UE.

As illustrated, at 1212, the remote UE 1202 may transmit an RRC request, the RRC request may be a request to establish an RRC connection (e.g., an RRC setup request), a request to resume an RRC connection (e.g., an RRC resume request), or a request to reestablish an RRC connection (e.g., an RRC reestablishment or RRC set up message). The remote UE 1202 then applies, e.g., starts, a corresponding timer based on the RRC connected state of the relay UE, at 1214. The timer applied at 1214 is the timer indicated by the base station 1206 in the system information 1210.

The relay UE 1204 transmits an additional timer to the UE 1202 for application in connection with an RRC connection request via the relay UE. As an example, in response to reception of the RRC request, at 1212, e.g., an SRBO message, from the remote UE 1202, the relay UE 1204 may transmit an indication 1216 of an additional timer to the remote UE 1202 via sidelink. As illustrated at 1218, the UE may apply the timer from the relay UE in combination with the timer from the base station. For example, the UE may add the additional timer value to the running timer from the base station. The additional amount of time may help to compensate for additional time used by the relay UE. In some aspects, the amount of additional time, at 1216, may be based on the RRC connection state of the relay UE 1204, e.g., longer if the relay UE is in an RRC idle/inactive state and shorter if the relay UE is in an RRC connected state.

The remote UE 1202 may start and stop the base station timer (e.g., with the additional time indicated by the relay UE) in the same manner as described in connection with FIG. 10 or FIG. 11.

In some aspects, if a remote UE is connected to a network via an L2 relay, and the remote UE initiates an RRC resume or RRC reestablishment via a different base station directly or via a different relay UE, the base station may respond with an RRC set up message to the remote UE. FIG. 13A illustrates an example communication flow 1300 between a remote UE 1302, a relay UE 1304, a first base station 1306, and a second base station 1308. At 1310, the remote UE 1302 establishes an RRC connection with the first base station 1306 via the relay UE 1304. At 1312, the remote UE 1302 transmits an RRC request (e.g., an RRC connection request, an RRC resume request, or an RRC reestablishment request) directly (e.g., in a Uu message and without a UE relay) with a second base station 1308. The second base station 1308 responds with an RRC setup message 1314. FIG. 13B illustrates an example communication flow 1350 between a remote UE 1302, a relay UE 1304, a first base station 1306, and a second base station 1308. At 1320, the remote UE 1302 establishes an RRC connection with the first base station 1306 via the relay UE 1304. At 1322, the remote UE 1302 transmits an RRC request (e.g., an RRC connection request, an RRC resume request, or an RRC reestablishment request) to a second base station 1308 via a second relay UE 1305. The second base station 1308 responds with an RRC setup message 1324 via the second relay UE 1305.

Figure 14A:
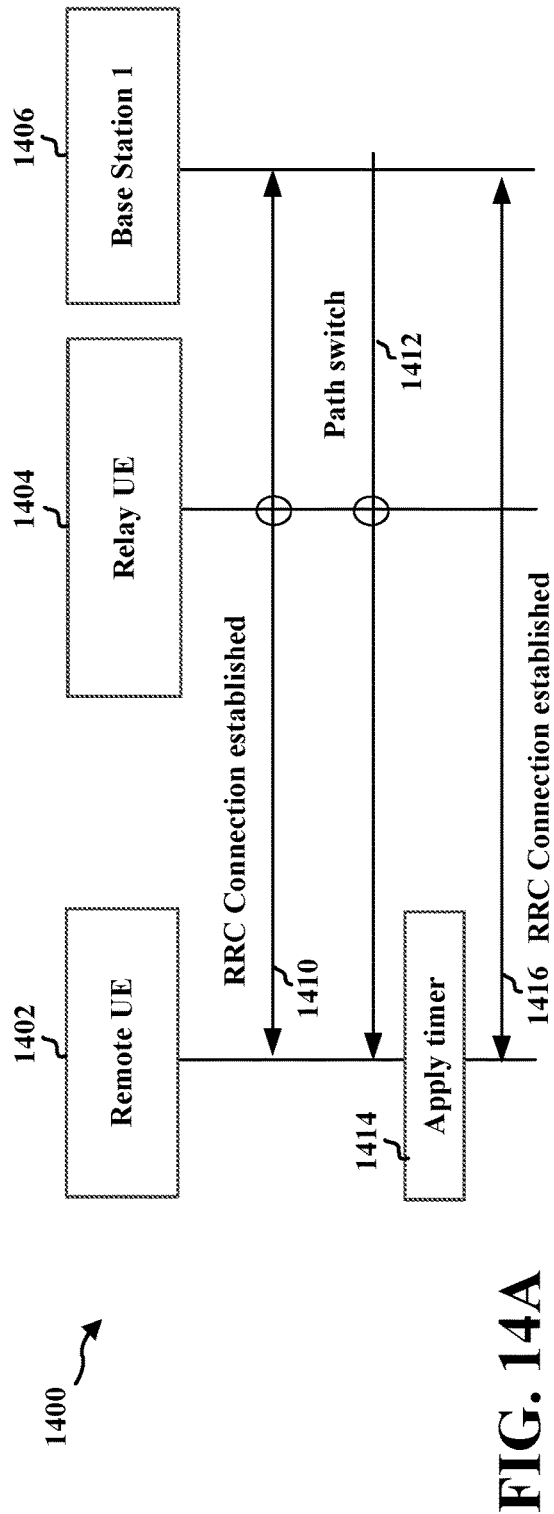
FIGS. 14A and 14B illustrate communication flows between a remote UE, a relay UE, and a network.
Figure 14B:
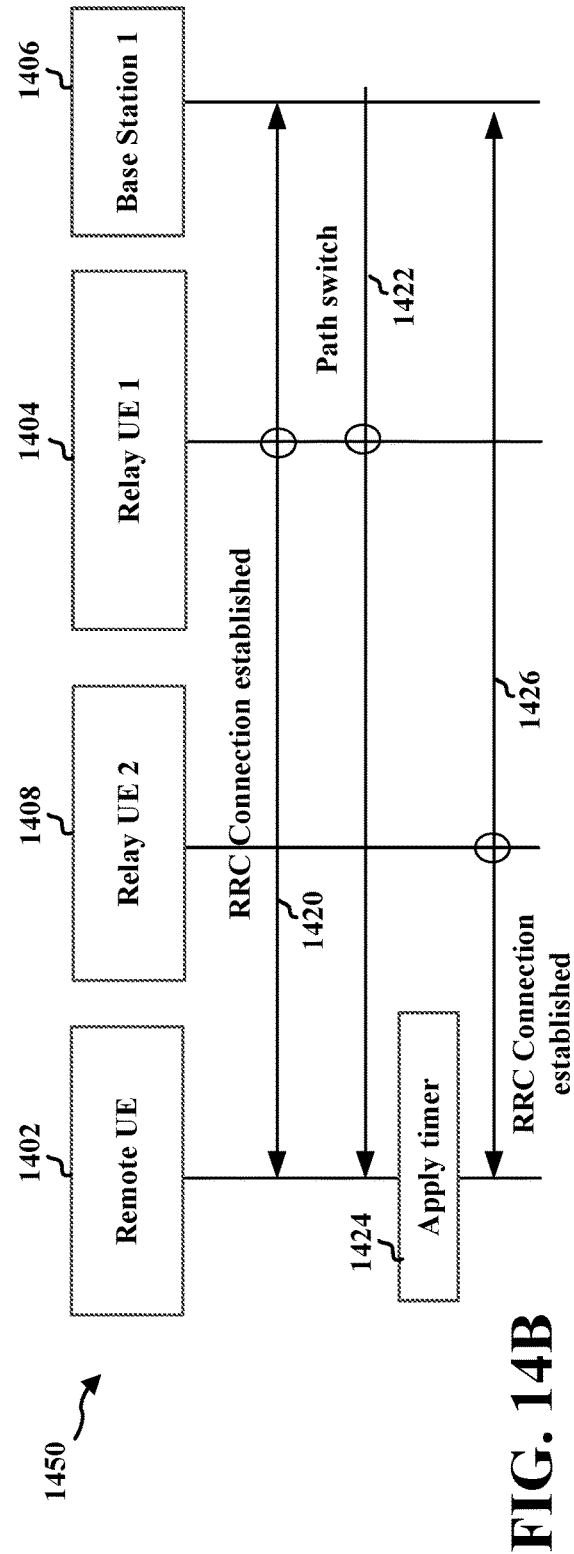

A base station may indicate a timer to a UE to be applied in connection with an RRC reconfiguration that involves a path switch, such as a path switch between a direct path and an indirect path or between two different indirect paths. The timer may be similar to a T304 timer that is started upon reception of an RRC connection reconfiguration message including the mobility control information or reception of a mobility from EUTRA command message including a cell order change (e.g., "CellChangeOrder") and is stopped based on a successful handover or cell change (e.g., handover or cell change criteria having been met). If the timer expires, the UE may initiate an RRC reestablishment procedure or take other action. The timer provided by the base station may be similar to the T304 timer and may be specific to a path switch in which at least one path includes a relay UE. The UE may start the timer upon reception of an RRC reconfiguration message, whereas the T304 timer is applied based on reception of a handover command. The UE may stop the timer based on successful completion of a Uu SRBO configuration. For example, when a unicast sidelink is not established, the stopping point may be successful completion of establishment of unicast sidelink link; when a unicast sidelink is already existing, it the stopping point may be successful completion of reconfiguration of sidelink RLC bearer for relaying. The UE may stop the timer based on successfully sending an RRC reconfiguration complete to relay, i.e., when a lower layer acknowledgement (RLC ACK or HARQ ACK) is received from a target relay UE. The UE may stop the timer based on successfully sending an RRC reconfiguration complete message to the base station, i.e., when a PDCP status report is received from target relay UE. FIG. 14A illustrates an example communication flow 1400 between a remote UE 1402, a relay UE 1404, and a base station 1406. At 1410, an RRC connection is established between the remote UE 1402 and the base station 1406 via the relay UE 1404. At 1412, the base station 1406 sends a path switch indication to the remote UE 1402, e.g., via the relay UE 1404. The path switch may indicate a switch to a direct path with the base station 1406. The base station may further indicate a timer to the remote UE 1402 for application in the path switch scenario. The remote UE 1402 applies the timer at 1414, and performs the path switch by establishing a direct, e.g., Uu connection without the relay UE, connection with the base station 1406, at 1416. FIG. 14B illustrates an example communication flow 1450 between a remote UE 1402, a relay UE 1404, and a base station 1406. At 1420, an RRC connection is established between the remote UE 1402 and the base station 1406 via the relay UE 1404. At 1422, the base station 1406 sends a path switch indication to the remote UE 1402, e.g., via the relay UE 1404. The path switch may indicate a switch to a different indirect path with the base station 1406. The base station may further indicate a timer to the remote UE 1402 for application in the path switch scenario. The remote UE 1402 applies the timer at 1424, and performs the path switch by establishing an RRC connection with the base station 1406, at 1426 via a second relay UE 1408.

Figure 15:
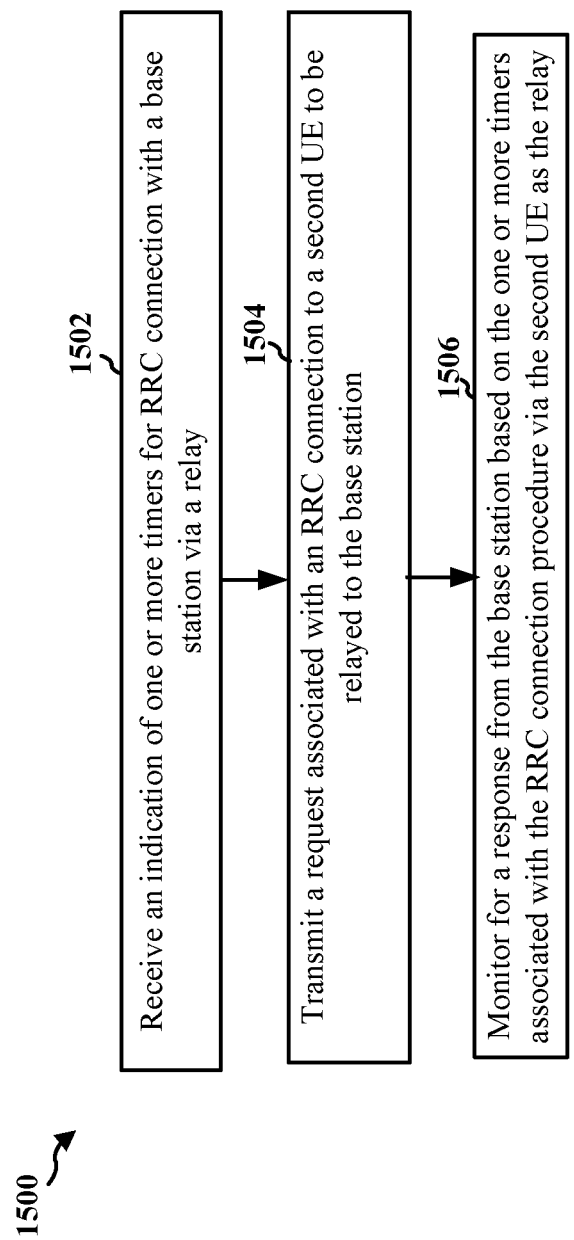
FIG. 15 is a flowchart of a method of wireless communication.

FIG. 15 is a flowchart 1500 of a method of wireless communication. The method may be performed by a first UE (e.g., the UE 104, the remote UE 502, 602, 702, 802, 902, 1002, 1102, 1202, 1302, 1402; the apparatus 1602). The method may reduce latency for a remote UE to establish an RRC connection with a base station via a relay UE, e.g., by providing timers that relate to relayed communication.

At 1502, the first UE receives an indication of one or more timers for an RRC connection procedure with a base station via a relay. The reception may be performed, e.g., by the timer component 1640 of the apparatus 1602 in FIG. 16. FIGS. 10, 11, and 12 illustrate various examples of a base station providing timer information in system information 1010, 1116, and 1210, and a relay UE providing additional timing information, e.g., at 1216. The UE may receive timers similar to T300, T319, T301, and/or T311 that are adjusted for (e.g., include additional time) for an RRC connection procedure to be relayed via a relay UE. The first UE may have a sidelink connection to the relay UE, e.g., as described in connection with any of FIGS. 5-9, for relay of communication from the first UE to the base station over a Uu connection between the second UE and the base station. The relay of communication may include L2 relay, e.g., as described in connection with the example in FIG. 7. The first UE may transmit and receive relayed communication with the base station. The exchange of relayed communication may be performed, e.g., by the relayed communication component 1646 of the apparatus 1602 in FIG. 16.

In some aspects, the indication may be received in system information from the base station, e.g., as described in connection with any of FIGS. 10-12. The one or more timers may include at least one of: an RRC connection establishment timer, an RRC connection resume timer, or two RRC connection re-establishment timers. The system information may further include an additional set of the one or more timers for the RRC connection procedure for UEs that do not support the RRC connection procedure via the relay, wherein the first UE refrains from applying the additional set of the one or more timers for the RRC connection procedure.

At 1504, the first UE transmits a request associated with an RRC connection to a second UE to be relayed to the base station. The request may be transmitted, e.g., by the RRC connection component 1642 of the apparatus 1602 in FIG. 16. The request may be transmitted over the sidelink to the second UE for communication over a Uu connection between the second UE and the base station. The request may be a request to establish an RRC connection with the base station via the second UE. The request may be a request to resume an RRC connection with the base station via the second UE. The request may be a request to reestablish an RRC connection with the base station via the second UE. FIGS. 9-13B illustrate example aspects of a base station receiving an RRC connection request from a first UE.

At 1508, the first UE monitors for a response from the base station based on the one or more timers associated with the RRC connection procedure via the second UE as the relay. The monitoring may be performed, e.g., by the monitor component 1644 of the apparatus 1602 in FIG. 16.

In some aspects monitoring for the response may further include starting the one or more timers in response to a transmission of the request; and stopping the one or more timers in response to one of: an RRC setup message from the base station, an RRC reject message from the base station, a cell reselection, a relay reselection, or stopping connection establishment by an upper layer.

In some aspects, the first UE may start the one or more timers in response to transmission of the request; and may perform recovery or entering an RRC idle state in response to the one or more timers expiring.

In some aspects, the request may include an RRC resume request, and the first UE may start an RRC connection resume timer in response to a transmission of the RRC resume request; and stop the one or more timer in response to one of: an RRC resume response from the base station, an RRC setup message from the base station, an RRC release message from the base station, a message to suspend a configuration from the base station, an RRC reject message from the base station, a cell reselection, a relay reselection, or stopping connection establishment by an upper layer.

In some aspects, the request may include an RRC re-establishment request, and the first UE may start an RRC connection re-establishment timer in response to a transmission of the RRC re-establishment request; and stop the one or more timer in response to one of: an RRC re-establishment response from the base station, an RRC setup message from the base station, or a cell metric for the base station dropping below a threshold.

In some aspects, the request may include an RRC re-establishment request, and the first UE may start an RRC connection re-establishment timer in response to an initiation of an RRC re-establishment procedure; and stop the one or more timer in response to selection of at least one of a first cell meeting cell selection criteria, the second UE meeting relay criteria, or a second cell with a different RAT.

In some aspects, the one or more timers may be indicated in system information from the base station that includes a first timer for use when the second UE is in an RRC connected state and a second timer for use when the second UE is in an RRC idle or RRC inactive state. The system information may further include an additional set of the one or more timers for the RRC connection independent of the relay. The first UE may receive, from the relay UE, information about a connection state for the second UE, wherein the first UE monitors for the response from the base station based on the first timer or the second timer based on the connection state of the second UE. The indication may be comprised in at least one of a sidelink discovery message or a sidelink RRC message. FIG. 11 illustrates an example of a remote UE receiving an indication of an RRC state of a relay UE. In some aspects, the one or more timer may be independent of a connection state of the relay.

In some aspects, the indication may be received in a sidelink message from the second UE, and the first UE may add the one or more timer as an additional amount of time for a timer indicated by the base station. FIG. 12 illustrates an example of a remote UE receiving additional timer information from a relay UE.

In some aspects, the first UE may initiate, while in an RRC connected state, a procedure to resume the RRC connection with at least one of a different base station or a different relay. The initiation may be performed, e.g., by the RRC connection component 1642 of the apparatus 1602 in FIG. 16. In response, the first UE may receive an RRC setup message in response to initiating the procedure, and may enter an RRC idle state, e.g., as described in connection with FIGS. 13A and 13B. In some aspects, the first UE may initiate, while in an RRC connected state, a procedure to reestablish the RRC connection with at least one of a different base station or a different relay. In response, the first UE may receive an RRC setup message in response to initiating the procedure, and may enter an RRC idle state, e.g., as described in connection with FIGS. 13A and 13B.

In some aspects, the first UE may receive, from the base station, an RRC reconfiguration message indicating an additional timer associated with a path switch and perform the path switch based on the additional timer. The reception of the additional timer may be performed, e.g., by the timer component 1640 of the apparatus 1602 in FIG. 16. FIGS. 14A and 14B illustrate example aspects in connection with a path switch and the additional timer. The path switch may include a first change from an indirect path to the base station via the second UE to a direct path to the base station or a second change to a different relay. Performing the path switch based on the additional timer may include starting the additional timer in response to reception of the RRC reconfiguration message. The first UE may stop the additional timer in response to at least one of a successful completion of an SRB0 configuration (e.g., establishment of the unicast sidelink for relaying), an acknowledgment of an RRC reconfiguration complete message from the second UE (e.g., in an RLC ACK or HARQ ACK), an acknowledgment of the RRC reconfiguration complete message from the base station (e.g., a PDCP status report), or a successful transmission of an RRC reconfiguration complete message.

Figure 16:
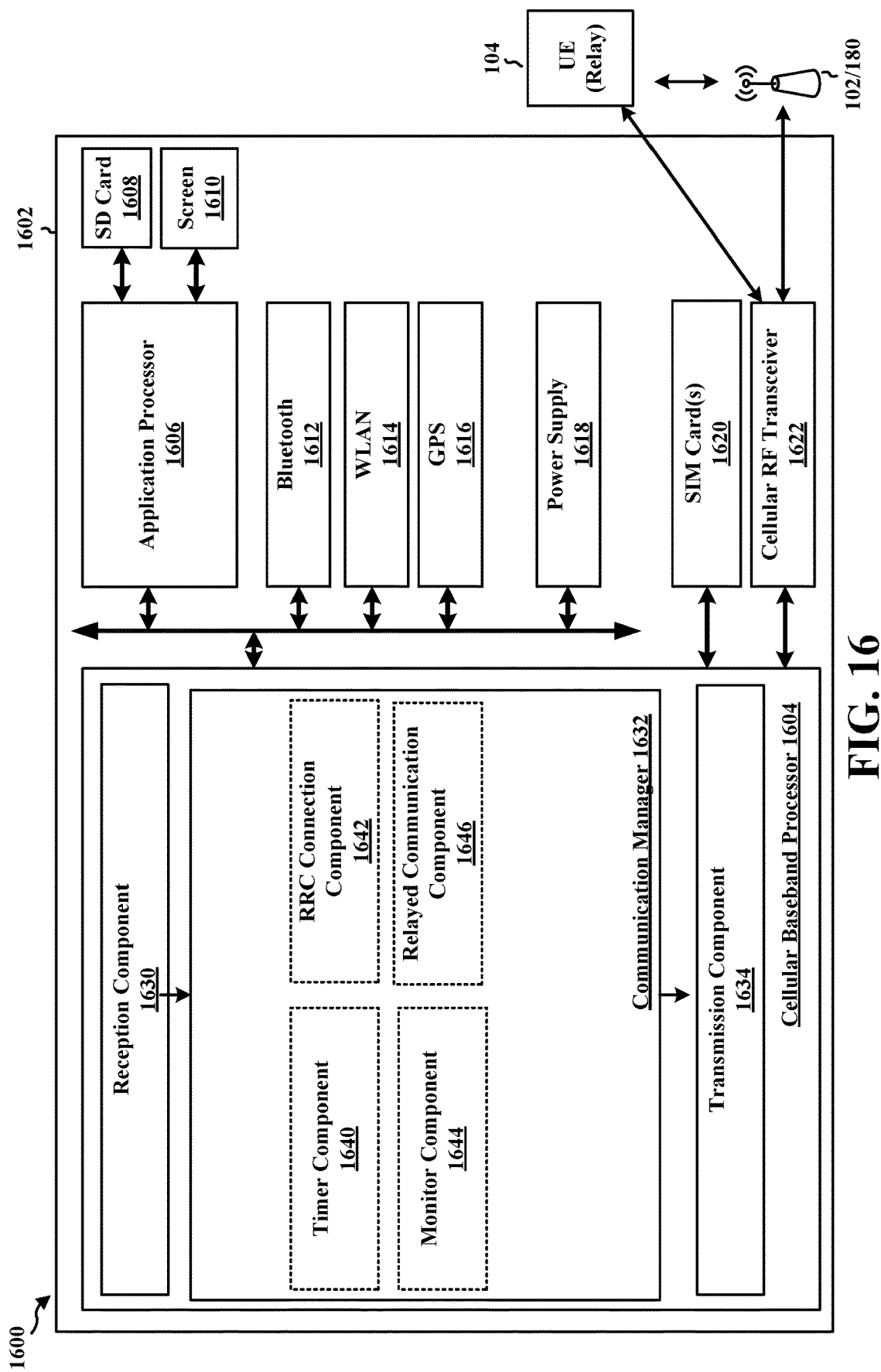
FIG. 16 is a diagram illustrating an example of a hardware implementation for an example apparatus.

FIG. 16 is a diagram 1600 illustrating an example of a hardware implementation for an apparatus 1602. The apparatus 1602 may be a UE, a component of a UE, or may implement UE functionality. In some aspects, the apparatus 1602 may include a cellular baseband processor 1604 (also referred to as a modem) coupled to a cellular RF transceiver 1622. In some aspects, the apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, or a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the device 350 and may include the memory 360 and/or at least one of the TX processor 368, the RX processor 356, and the controller/processor 359. In one configuration, the apparatus 1602 may be a modem chip and include just the cellular baseband processor 1604, and in another configuration, the apparatus 1602 may be the entire UE (e.g., see the device 350 of FIG. 3) and include the additional modules of the apparatus 1602.

The communication manager 1632 includes a timer component 1640 that is configured to receive an indication of one or more timers associated with an RRC connection procedure with a base station via a relay, e.g., as described in connection with 1502 in FIG. 15. The communication manager 1632 further includes a RRC connection component 1642 that is configured to transmit a request associated with an RRC connection to a second UE to be relayed to the base station, e.g., as described in connection with 1504 in FIG. 15. The communication manager 1632 further includes a monitor component 1644 that is configured to monitor for a response from the base station based on the one or more timers associated with the RRC connection procedure via the second UE as the re, e.g., as described in connection with 1506 in FIG. 15. In some aspects, the timer component 1640 may be further configured to start the one or more timers in response to transmission of the request and stop the timers in response to one or more conditions. The RRC connection component 1642 may be further configured to perform recovery, perform a NAS procedure, or enter an RRC idle state in response to a timer expiring. The RRC connection component 1642 and/or the reception component 1630 may be configured to receive, from the second UE, information about a connection state for the second UE. The timer component 1640 may be configured to apply the corresponding timer based on the connection state of the second UE, and the monitor component 1644 may be configured to monitor for the response from the base station based on the corresponding timer. The RRC connection component 1642 may be further configured to initiate, while in an RRC connected state, a procedure to reestablish or resume an RRC connection with a different base station or second UE, to receive an RRC set up message in response, and to enter an RRC idle state. The timer component 1640 may be further configured to receive, from the base station, an RRC reconfiguration message indicating an additional timer associated with a path switch. The RRC connection component 1642 may be further configured to perform the path switch based on the additional timer.

The apparatus may include additional components that perform each of the blocks of the algorithm in the flowchart of FIG. 15, and/or the aspects performed by the first UE in any of FIGS. 5-14B. As such, each block in the flowchart of FIG. 15, and/or the aspects performed by the first UE in any of FIGS. 5-14B may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the cellular baseband processor 1604, includes means for receiving an indication of one or more timers for an RRC connection procedure with a base station via a relay; means for transmitting a request associated with an RRC connection to a second UE to be relayed to the base station; and means for monitoring for a response from the base station based on the one or more timers associated with the RRC connection procedure via the second UE as the re. The apparatus 1602 may further include means for starting the one or more timer in response to transmission of the request, means for performing recovery or entering an RRC idle state in response to the one or more timer expiring, and means for stopping the one or more timer in response to a condition. The apparatus 1602 may further include receiving, from the second UE, information about a connection state for the second UE, wherein the first UE monitors for the response from the base station based on the first timer or the second timer based on the connection state of the second UE. The apparatus 1602 may further include means for adding one or more timer from a second UE as an additional amount of time for a timer indicated by the base station. The apparatus 1602 may further include means for initiating, while in an RRC connected state, a procedure to resume the RRC connection or re-establish the RRC connection with at least one of a different base station or a different relay; means for receiving an RRC setup message in response to initiating the procedure; and means for entering RRC idle state. The apparatus 1602 may further include means for receiving, from the base station, an RRC reconfiguration message indicating an additional timer associated with a path switch; and means for performing the path switch based on the additional timer. The means may be one or more of the components of the apparatus 1602 configured to perform the functions recited by the means. As described supra, the apparatus 1602 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 17:
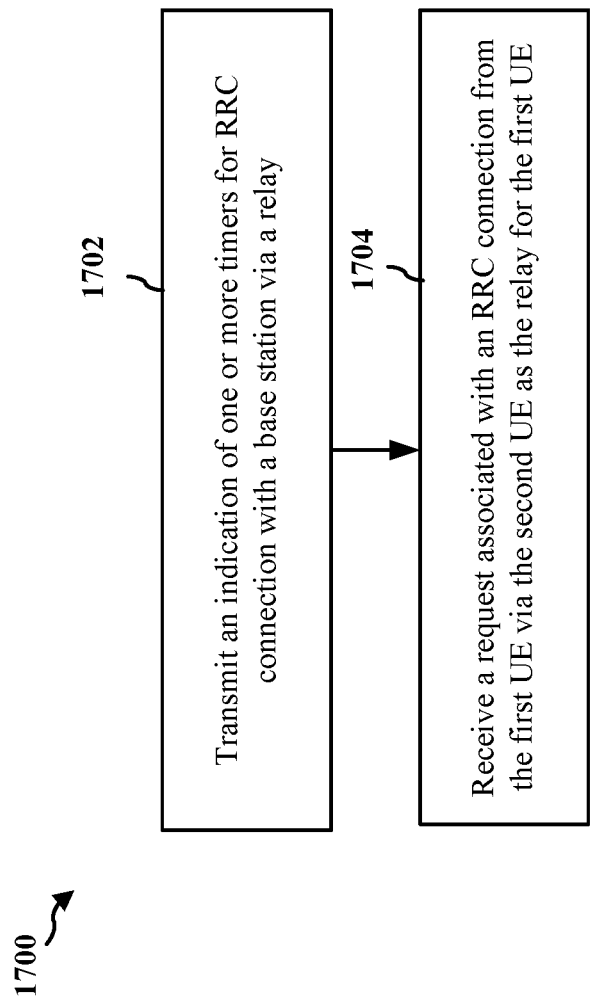
FIG. 17 is a flowchart of a method of wireless communication.

FIG. 17 is a flowchart 1700 of a method of wireless communication. The method may be performed by a network entity such as a base station or a component of a base station (e.g., the base station 102, 180, 1306, 1406; RAN 506, 606, 706, 806 906, 1006, 1106, 1206; the apparatus 1802). The method may reduce latency for a first UE to establish an RRC connection via a second UE, e.g., by providing timers that relate to relayed communication.

At 1702, the base station outputs (e.g., transmits) system information indicating one or more timers associated with an RRC connection procedure of a first UE via a relay. The transmission may be performed, e.g., by the timer component 1840 of the apparatus 1802 in FIG. 18. FIGS. 10, 11, and 12 illustrate various examples of a base station providing timer information in system information 1010, 1116, and 1210. The base station may provide timers similar to T300, T319, T301, and/or T311 that are adjusted for (e.g., include additional time) for an RRC connection procedure to be relayed via a relay UE. The relay may include a first UE that has a sidelink connection to the second UE, and the second UE may relay communication from the first UE to the base station over a Uu connection. The relay of communication may include L2 relay, e.g., as described in connection with the example in FIG. 7. The base station may transmit and received relayed communication with the second UE. The exchange of relayed communication may be performed, e.g., by the relay component 1844 of the apparatus 1802 in FIG. 18. The one or more timers may include at least one of: an RRC connection establishment timer, an RRC connection resume timer, or two RRC connection re-establishment timers. The system information may further include an additional set of the one or more timer for the RRC connection independent of the relay, e.g., timers that are independent of the relay capable UE, and this set of timers may be ignored by relay capable UEs. The one or more timer may include a first timer for use when the second UE is in an RRC connected state and a second timer for use when the second UE is in an RRC idle or RRC inactive state.

At 1704, the base station obtains (e.g., receives) a request associated with an RRC connection from the first UE via a second UE as the relay for the first UE. The request may be received, e.g., by the RRC connection component 1842 of the apparatus 1802 in FIG. 18. The request may be a request to establish an RRC connection with the base station via the second UE. The request may be a request to resume an RRC connection with the base station via the second UE. The request may be a request to reestablish an RRC connection with the base station via the second UE. FIGS. 9-13B illustrate example aspects of a base station receiving an RRC connection request from a first UE.

The base station may further transmit an RRC setup message in response to the first UE (e.g., via the second UE) initiating a procedure to resume the RRC connection or re-establish the RRC connection with at least one of a different base station or a different relay UE. FIGS. 13A and 13B illustrate example aspects of a base station 1308 providing the RRC setup message as a response to a remote UE 1302. The transmission may be performed, e.g., by the RRC connection component 1842 of the apparatus 1802 in FIG. 18.

The base station may further transmit, to the UE, an RRC reconfiguration message indicating an additional timer associated with a path switch. The path switch may include a first change from an indirect path to the base station via the second UE to a direct path to the base station or a second change to a different relay UE. FIGS. 14A and 14B illustrate example aspects of a base station 1408 providing the timer to the UE as part of a path switch. The transmission may be performed, e.g., by the timer component 1840 of the apparatus 1802 in FIG. 18.

Figure 18:
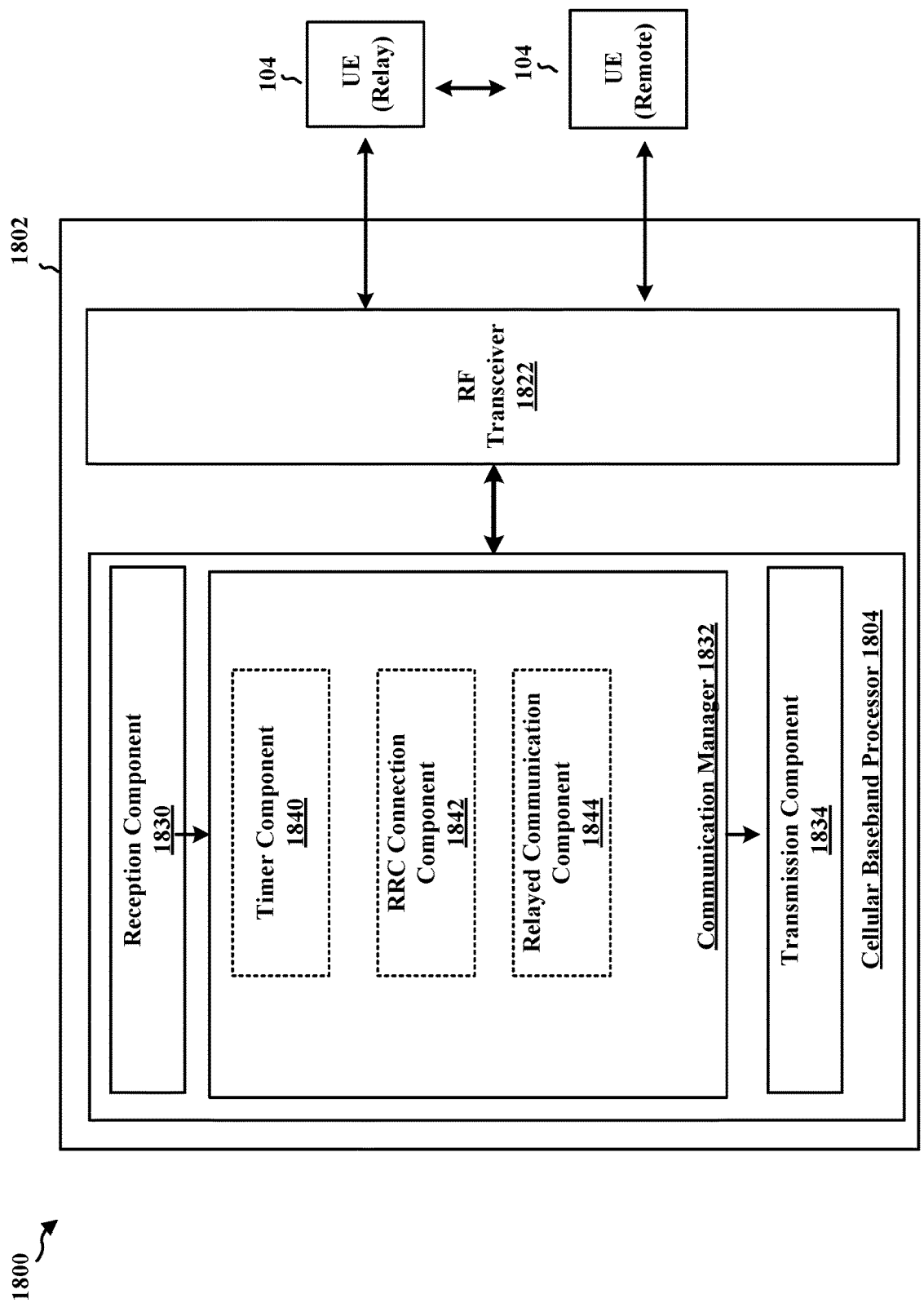
FIG. 18 is a diagram illustrating an example of a hardware implementation for an example apparatus.

FIG. 18 is a diagram 1800 illustrating an example of a hardware implementation for an apparatus 1802. The apparatus 1802 may be a network entity, such as a base station, a component of a base station, or may implement base station functionality. In some aspects, the apparatus 1602 may include a baseband unit 1804. The baseband unit 1804 may communicate through a cellular RF transceiver 1822 with the UE 104. The baseband unit 1804 may include a computer-readable medium/memory. The baseband unit 1804 is responsible for general processing, including the execution of software stored on the computer-readable medium/memory. The software, when executed by the baseband unit 1804, causes the baseband unit 1804 to perform the various functions described supra. The computer-readable medium/memory may also be used for storing data that is manipulated by the baseband unit 1804 when executing software. The baseband unit 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband unit 1804. The baseband unit 1804 may be a component of the device 310 and may include the memory 376 and/or at least one of the TX processor 316, the RX processor 370, and the controller/processor 375.

The communication manager 1832 includes a timer component 1840 that is configured to transmit an indication of one or more timers for an RRC connection procedure with a base station via a relay, e.g., as described in connection with 1702 in FIG. 17. The communication manager 1832 further includes an RRC connection component 1842 that receives a request associated with an RRC connection from the first UE via a second UE as the relay for the first UE, e.g., as described in connection with 1704 in FIG. 17. In some aspects, the RRC connection component 1842 may be further configured to transmit an RRC setup message in response to the first UE initiating a procedure to resume the RRC connection or re-establish the RRC connection with at least one of a different base station or a different relay. In some aspects, the timer component 1840 may be further configured to transmit, to the first UE, an RRC reconfiguration message indicating an additional timer associated with a path switch.

The apparatus may include additional components that perform each of the blocks of the algorithm in the flowchart of FIG. 17 and/or the aspects performed by the base station in any of FIGS. 5-14B. As such, each block in the flowchart of FIG. 17 and/or the aspects performed by the base station in any of FIGS. 5-14B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the baseband unit 1804, includes means for transmitting system information indicating one or more timer for RRC connection of a remote UE via a relay UE; and means for receiving a request associated with an RRC connection from the remote UE via the relay UE for relay to the base station. The apparatus 1802 may further include means for transmitting an RRC setup message in response to the UE initiating a procedure to resume the RRC connection or re-establish the RRC connection with at least one of a different base station or a different relay UE. The apparatus 1802 may further include means for transmitting, to the UE, an RRC reconfiguration message indicating an additional timer associated with a path switch. The means may be one or more of the components of the apparatus 1802 configured to perform the functions recited by the means. As described supra, the apparatus 1802 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 19:
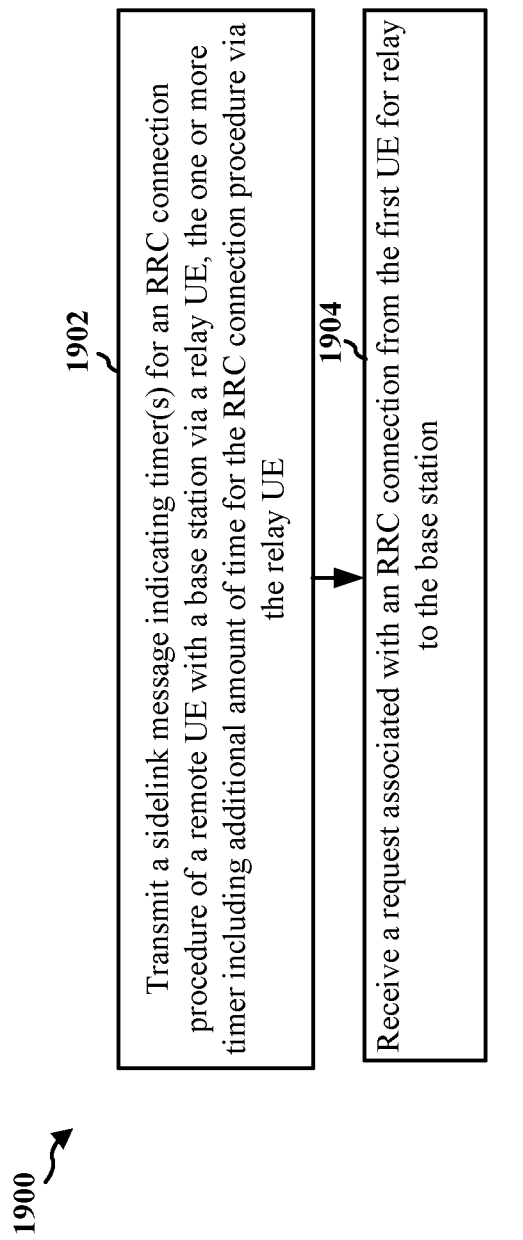
FIG. 19 is a flowchart of a method of wireless communication.

FIG. 19 is a flowchart 1900 of a method of wireless communication. The method may be performed by a second UE that operates as a relay for a first UE (e.g., the UE 104, the relay UE 504, 604, 704, 804, 904, 1004, 1104, 1204, 1304, 1404; the apparatus 2002). The method may enable the second UE to provide timing information to a remote UE for an addition to an RRC connection timer. The method may assist the first UE and improve latency of RRC connection and communication for the second UE.

At 1902, the second UE transmits a sidelink message indicating one or more timer for an RRC connection procedure of a first UE with a network entity, such as a base station, via a second UE, the one or more timer including additional amount of time for the RRC connection procedure via the second UE. The sidelink message may be a sidelink discovery message or a sidelink RRC message, e.g., as described in connection with the example in FIG. 12. The one or more timers may be independent of a connection state of the second UE. The transmission may be performed, e.g., by the timer component 2040 of the apparatus 2002 in FIG. 20.

At 1904, the second UE receives a request associated with an RRC connection from the first UE for relay to the base station. The reception may be performed, e.g., by the RRC connection component 2042 of the apparatus 2002 in FIG. 20. FIG. 12 illustrates an example RRC request 1212. The RRC request may be an RRC connection establishment request (e.g., set up request) for a base station via the second UE as a relay. The RRC request may be an RRC connection resume request for a base station via the second UE. The RRC request may be an RRC connection reestablishment request for a base station via the second UE. The second UE may receive the request via sidelink and may relay the request to the network over a Uu connection, e.g., access link, with the base station. The relay may be based on an L2 relay configuration, e.g., as described in connection with FIG. 7. The relay may be performed, e.g., by the relay component 2044 of the apparatus 2002 in FIG. 20.

Figure 20:
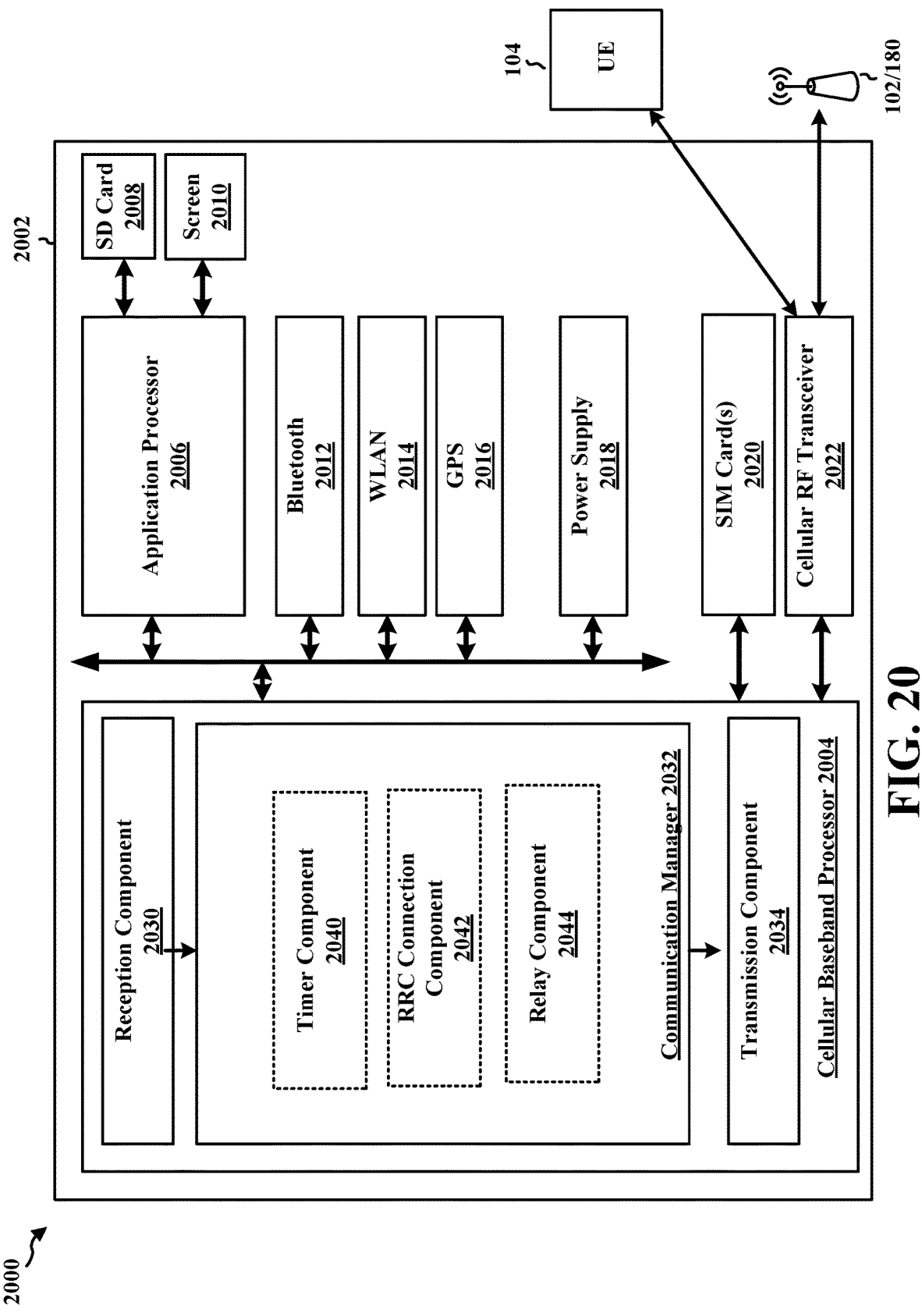
FIG. 20 is a diagram illustrating an example of a hardware implementation for an example apparatus.

FIG. 20 is a diagram 2000 illustrating an example of a hardware implementation for an apparatus 2002. The apparatus 2002 may be a UE, a component of a UE, or may implement UE functionality. In some aspects, the apparatus 2002 may include a cellular baseband processor 2004 (also referred to as a modem) coupled to a cellular RF transceiver 2022. In some aspects, the apparatus 2002 may further include one or more subscriber identity modules (SIM) cards 2020, an application processor 2006 coupled to a secure digital (SD) card 2008 and a screen 2010, a Bluetooth module 2012, a wireless local area network (WLAN) module 2014, a Global Positioning System (GPS) module 2016, or a power supply 2018. The cellular baseband processor 2004 communicates through the cellular RF transceiver 2022 with the UE 104 and/or BS 102/180. The cellular baseband processor 2004 may include a computer-readable medium/memory. The computer-readable medium/memory may be non-transitory. The cellular baseband processor 2004 is responsible for general processing, including the execution of software stored on the computer-readable medium/memory. The software, when executed by the cellular baseband processor 2004, causes the cellular baseband processor 2004 to perform the various functions described supra. The computer-readable medium/memory may also be used for storing data that is manipulated by the cellular baseband processor 2004 when executing software. The cellular baseband processor 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the cellular baseband processor 2004. The cellular baseband processor 2004 may be a component of the device 350 and may include the memory 360 and/or at least one of the TX processor 368, the RX processor 356, and the controller/processor 359. In one configuration, the apparatus 2002 may be a modem chip and include just the cellular baseband processor 2004, and in another configuration, the apparatus 2002 may be the entire UE (e.g., see the device 350 of FIG. 3) and include the additional modules of the apparatus 2002.

The communication manager 2032 includes a timer component 2040 that is configured to transmit a sidelink message indicating one or more timers for a radio resource control (RRC) connection procedure of a first UE with a base station via a second UE, the one or more timer including additional amount of time for the RRC connection procedure via the relay UE, e.g., as described in connection with 1902 in FIG. 19. The communication manager 2032 further includes an RRC connection component 2042 that is configured to receive a request associated with an RRC connection to the second UE for relay to the base station, e.g., as described in connection with 1904 in FIG. 19. The communication manager 2032 may further include a relay component 2044 configured to relay communication, e.g., including the RRC connection request, for the first UE to the base station, e.g., as described in connection with any of FIGS. 5-14B.

The apparatus may include additional components that perform each of the blocks of the algorithm in the flowchart of FIG. 19 and/or the aspects performed by the relay UE in FIGS. 5-14B. As such, each block in the flowchart of FIG. 19 and/or the aspects performed by the relay UE in FIGS. 5-14B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2002 may include a variety of components configured for various functions. In one configuration, the apparatus 2002, and in particular the cellular baseband processor 2004, includes means for transmitting a sidelink message indicating one or more timer for an RRC connection procedure of a remote UE with a base station via a relay UE, the one or more timer including additional amount of time for the RRC connection procedure via the relay UE; and means for receiving a request associated with an RRC connection from the remote UE for relay to the base station. The means may be one or more of the components of the apparatus 2002 configured to perform the functions recited by the means. As described supra, the apparatus 2002 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of" "A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first UE, comprising: receiving an indication of one or more timers associated with a radio resource control (RRC) connection procedure with a base station via a relay; transmitting a request associated with an RRC connection to a second UE to be relayed to the base station; and monitoring for a response from the base station based on the one or more timers associated with the RRC connection procedure via the second UE as the relay.

In aspect 2, the method of claim 1 further includes that the indication is received in system information from the base station.

In aspect 3, the method of aspect 2 further includes that the one or more timers include at least one of: an RRC connection establishment timer, an RRC connection resume timer, or two RRC connection re-establishment timers.

In aspect 4, the method of aspect 2 or aspect 3 further includes that the system information further includes an additional set of the one or more timers for the RRC connection procedure for UEs that do not support the RRC connection procedure via the relay, wherein the first UE refrains from applying the additional set of the one or more timers for the RRC connection procedure.

In aspect 5, the method of any of aspects 1-4 further includes that monitoring for the response further includes: starting the one or more timers in response to a transmission of the request; and stopping the one or more timers in response to one of: an RRC setup message from the base station, an RRC reject message from the base station, a cell reselection, a relay reselection, or stopping connection establishment by an upper layer.

In aspect 6, the method of any of aspects 1-5 further includes starting the one or more timers in response to a transmission of the request; and performing recovery or entering an RRC idle state in response to the one or more timers expiring.

In aspect 7, the method of any of aspects 1-4 further includes that the request comprises an RRC resume request, the method further comprising: starting an RRC connection resume timer in response to a transmission of the RRC resume request; and stopping the one or more timers in response to one of: an RRC resume response from the base station, an RRC setup message from the base station, an RRC release message from the base station, a message to suspend a configuration from the base station, an RRC reject message from the base station, a cell reselection, a relay reselection, or stopping connection establishment by an upper layer.

In aspect 8, the method of any of aspects 1-4 further includes that the request comprises an RRC re-establishment request, the method further comprising: starting an RRC connection re-establishment timer in response to a transmission of the RRC re-establishment request; and stopping the one or more timers in response to one of: an RRC re-establishment response from the base station, an RRC setup message from the base station, or a cell metric for the base station dropping below a threshold.

In aspect 9, the method of any of aspects 1-4 further includes that the request comprises an RRC re-establishment request, the method further comprising: starting an RRC connection re-establishment timer in response to initiation of an RRC re-establishment procedure; and stopping the one or more timers in response to selection of at least one of a first cell meeting a cell selection criteria, the first UE meeting a relay criteria, or a second cell with a different radio access technology (RAT).

In aspect 10, the method of any of aspects 1-9 further includes that the one or more timers are indicated in system information from the base station that includes a first timer for use when the second UE is in an RRC connected state and a second timer for use when the second UE is in an RRC idle or RRC inactive state.

In aspect 11, the method of aspect 10 further includes that the system information further includes an additional set of the one or more timers for the RRC connection independent of the relay.

In aspect 12, the method of aspect 10 or aspect 11 further includes receiving, from the second UE, information about a connection state for the second UE, wherein the first UE monitors for the response from the base station based on the first timer or the second timer based on the connection state of the second UE.

In aspect 13, the method of aspect 12 further includes the indication is comprised in at least one of a sidelink discovery message or a sidelink RRC message.

In aspect 14, the method of any of aspects 1-9 further includes that the one or more timers are independent of a connection state of the second UE.

In aspect 15, the method of any of aspects 1-9 further includes that the indication is received in a sidelink message from the second UE, the method further comprising: adding the one or more timers as an additional amount of time for a timer indicated by the base station.

In aspect 16, the method of any of aspects 1-15 further includes initiating, while in an
RRC connected state, a procedure to re-establish the RRC connection with at least one of a different base station or a different relay; receiving an RRC setup message in response to initiating the procedure; and entering an RRC idle state.

In aspect 17, the method of any of aspects 1-15 further includes initiating, while in an RRC inactive state, a procedure to resume the RRC connection with at least one of a different base station or a different relay; receiving an RRC setup message in response to initiating the procedure; and entering an RRC idle state.

In aspect 18, the method of any of aspects 1-15 further includes receiving, from the base station, an RRC reconfiguration message indicating an additional timer associated with a path switch; and performing the path switch based on the additional timer.

In aspect 19, the method of aspect 18 further includes that the path switch includes a first change from an indirect path to the base station via the second UE to a direct path to the base station or a second change to a different relay.

In aspect 20, the method of aspect 18 or aspect 19 further includes that performing the path switch based on the additional timer includes: starting the additional timer in response to reception of the RRC reconfiguration message; and stopping the additional timer in response to at least one of completion of: a successful completion of an SRBO configuration, a first acknowledgment of an RRC reconfiguration complete message from the second UE, a second acknowledgment of the RRC reconfiguration complete message from the base station, or a successful transmission of the RRC reconfiguration complete message.

Aspect 21 is an apparatus for wireless communication at a first UE comprising means to perform the method of any of aspects 1-20.

In aspect 22, the apparatus of aspect 21 further includes at least one antenna and a transceiver coupled to the at least one antenna and the means to perform the method of any of aspects 1-20.

Aspect 23 is an apparatus for wireless communication at a first UE comprising memory and at least one processor coupled to the memory, the memory and the at least one processor configured to perform the method of any of aspects 1-20.

In aspect 24, the apparatus of aspect 23 further includes at least one antenna and a transceiver coupled to the at least one antenna and the at least one processor.

Aspect 25 is a non-transitory computer-readable storage medium storing computer executable code, the code when executed by a processor causes the processor to perform the method of any of aspects 1-20.

Aspect 26 is a method of wireless communication at a base station, comprising:

transmitting system information indicating one or more timers associated with a radio resource control (RRC) connection procedure of a first user equipment (UE) via a relay; and receiving a request associated with an RRC connection from the first UE via a second UE as the relay for the first UE.

In aspect 27, the method of aspect 26 further includes that the one or more timers include at least one of: an RRC connection establishment timer, an RRC connection resume timer, or two RRC connection re-establishment timers.

In aspect 28, the method of aspect 26 or 27 further includes that the system information further includes an additional set of the one or more timers for the RRC connection procedure independent of the relay.

In aspect 29, the method of any of aspects 26-28 further includes that the one or more timers include a first timer for use when the relay is in an RRC connected state and a second timer for use when the relay is in an RRC idle or RRC inactive state.

In aspect 30, the method of any of aspects 26-29 further includes transmitting an RRC setup message in response to the first UE initiating a procedure to resume the RRC connection or re-establish the RRC connection with at least one of a different base station or a different relay.

In aspect 31, the method of any of aspects 26-30 further includes transmitting, to the first UE, an RRC reconfiguration message indicating an additional timer associated with a path switch.

In aspect 32, the method of aspect 32 further includes that the path switch includes a first change from an indirect path to the base station via the second UE to a direct path to the base station or a second change to a different relay.

Aspect 33 is an apparatus for wireless communication at a base station comprising means to perform the method of any of aspects 26-32.

In aspect 34, the apparatus of aspect 33 further includes at least one antenna and a transceiver coupled to the at least one antenna and the means to perform the method of any of aspects 26-32.

Aspect 35 is an apparatus for wireless communication at a base station comprising memory and at least one processor coupled to the memory, the memory and the at least one processor configured to perform the method of any of aspects 26-32.

In aspect 36, the apparatus of aspect 35 further includes at least one antenna and a transceiver coupled to the at least one antenna and the at least one processor.

Aspect 37 is a non-transitory computer-readable storage medium storing computer executable code, the code when executed by a processor causes the processor to perform the method of any of aspects 26-32.

Aspect 38 is a method of wireless communication at a second user equipment (UE), comprising: transmitting a sidelink message indicating one or more timers associated with a radio resource control (RRC) connection procedure of a first UE with a base station via the second UE, the one or more timers including additional amount of time for the RRC connection procedure via the second UE; and receiving a request associated with an RRC connection from the first UE for relay to the base station.

In aspect 39, the method of aspect 38 further includes that the sidelink message is a sidelink discovery message or a sidelink RRC message.

In aspect 40, the method of aspect 38 or 39 further includes that the one or more timers are independent of a connection state of the second UE.

Aspect 41 is an apparatus for wireless communication at a second UE comprising means to perform the method of any of aspects 38-40.

In aspect 42, the apparatus of aspect 41 further includes at least one antenna and a transceiver coupled to the at least one antenna and the means to perform the method of any of aspects 38-40.

Aspect 43 is an apparatus for wireless communication at a second UE comprising memory and at least one processor coupled to the memory, the memory and the at least one processor configured to perform the method of any of aspects 38-40.

In aspect 44, the apparatus of aspect 43 further includes at least one antenna and a transceiver coupled to the at least one antenna and the at least one processor.

Aspect 45 is a non-transitory computer-readable storage medium storing computer executable code, the code when executed by a processor causes the processor to perform the method of any of aspects 38-40.

What is claimed is:

1. An apparatus for wireless communication at a first user equipment (UE), comprising:
   memory; and
   one or more processors coupled to the memory, the one or more processors configured to cause the first UE to:
   receive, in system information, an indication of one or more timers associated with a radio resource control (RRC) connection establishment procedure or an RRC connection re-establishment procedure with a network entity via a relay;
   transmit a request associated with an RRC connection to a second UE to be relayed to the network entity;
   start the one or more timers based on a transmission of the request from the first UE to the network entity via the relay; and
   monitor for a response from the network entity based on the one or more timers associated with the RRC connection establishment procedure or the RRC connection re-establishment procedure via the second UE as the relay.

2. The apparatus of claim 1, further comprising:
   at least one antenna; and
   a transceiver coupled to the at least one antenna and the one or more processors, wherein the one or more processors are configured to cause the first UE to transmit the request via the transceiver and the at least one antenna.

3. The apparatus of claim 1, wherein the one or more timers include an RRC connection establishment timer for the RRC connection establishment procedure via the relay.

4. The apparatus of claim 1, wherein the one or more timers include at least one RRC connection re-establishment timer for the RRC connection re-establishment procedure via the relay.

5. The apparatus of claim 4, wherein the one or more timers include two RRC connection re-establishment timers for the RRC connection re-establishment procedure via the relay.

6. The apparatus of claim 1, wherein the one or more processors are further configured to cause the first UE to receive an RRC connection resume timer for an RRC connection resume procedure via the relay.

7. The apparatus of claim 1, wherein the system information further includes an additional set of the one or more timers for one or more UE that fail to support the RRC connection establishment procedure or the RRC connection re-establishment procedure via the relay, wherein the one or more processors are further configured to cause the first UE to refrain from applying the additional set of the one or more timers for the RRC connection establishment procedure or the RRC connection re-establishment procedure.

8. The apparatus of claim 1, wherein the request comprises an RRC connection establishment request or an RRC connection re-establishment request, and the one or more processors are further configured to cause the first UE to:
stop the one or more timers in response to one of a relay reselection or a selected relay becoming unsuitable.

9. The apparatus of claim 1, wherein the one or more processors are further configured to cause the first UE to:
enter an RRC idle state in response to the one or more timers expiring.

10. The apparatus of claim 1, wherein the one or more processors are further configured to cause the first UE to:
receive, from the network entity, an RRC reconfiguration message indicating an additional timer associated with a path switch; and
perform the path switch based on the additional timer.

11. The apparatus of claim 10, wherein the path switch includes a change between a direct path with the network entity and an indirect path to the network entity via the second UE.

12. The apparatus of claim 10, wherein the path switch includes a change to a different relay for an indirect path to the network entity.

13. The apparatus of claim 10, wherein the one or more processors are further configured to cause the first UE to:
start the additional timer in response to reception of the RRC reconfiguration message; and
stop the additional timer in response to at least one of:
a successful completion of an SRB1 configuration,
reception of a first acknowledgment of an RRC reconfiguration complete message from the second UE,
reception of a radio link control (RLC) acknowledgement from a target relay UE,
reception of a second acknowledgment of the RRC reconfiguration complete message from the network entity, or
a successful transmission of the RRC reconfiguration complete message.

14. The apparatus of claim 10, wherein the one or more processors are further configured to cause the first UE to:
start the additional timer in response to reception of the RRC reconfiguration message; and
stop the additional timer in response to a successful transmission of an RRC reconfiguration complete message.

15. The apparatus of claim 1, wherein the request comprises an RRC re-establishment request, the one or more processors being further configured to cause the first UE to:
start an RRC connection re-establishment timer in response to initiation of an RRC re-establishment procedure; and
stop the one or more timers in response to selection of at least one of a first cell meeting a cell selection criteria, the first UE meeting a relay criteria, or a second cell with a different radio access technology (RAT).

16. The apparatus of claim 1, wherein the one or more timers indicated in the system information include a first timer for use when the second UE is in an RRC connected state and a second timer for use when the second UE is in an RRC idle or RRC inactive state.

17. The apparatus of claim 16, wherein the one or more processors are further configured to cause the first UE to:
receive, from the second UE, information about a connection state for the second UE, and monitor for the response from the network entity based on the first timer or the second timer according to the connection state of the second UE, wherein the information is comprised in at least one of a sidelink discovery message or a sidelink RRC message.

18. The apparatus of claim 1, wherein the one or more timers are independent of a connection state of the second UE.

19. The apparatus of claim 1, wherein the indication is received in a sidelink message from the second UE, the one or more processors being further configured to cause the first UE to:
add the one or more timers as an additional amount of time for a timer indicated by the network entity.

20. The apparatus of claim 1, wherein the one or more processors are further configured to cause the first UE to:
initiate, while in an RRC connected state, a procedure to re-establish the RRC connection with at least one of a different network entity or a different relay;
receive an RRC setup message in response to an initiation of the procedure; and
enter an RRC idle state.

21. The apparatus of claim 1, wherein the one or more processors are further configured to cause the first UE to:
initiate, while in an RRC inactive state, a procedure to resume the RRC connection with at least one of a different network entity or a different relay;
receive an RRC setup message in response to an initiation of the procedure; and
enter an RRC idle state.

22. The apparatus of claim 1, wherein the system information further indicates an additional set of at least one timer for the RRC connection establishment procedure or the RRC connection re-establishment procedure without the relay.

23. The apparatus of claim 1, wherein the one or more processors are further configured to cause the first UE to:
perform a non-access stratum (NAS) recovery procedure in response to the one or more timers expiring.

24. The apparatus of claim 1, wherein the first UE and the second UE are wireless devices that support sidelink communication.

25. The apparatus of claim 1, wherein at least one of the first UE and the second UE is a vehicle.

26. An apparatus for wireless communication at a first user equipment (UE), comprising:
memory; and
one or more processors coupled to the memory and configured to cause the first UE to:
communicate with a network entity via a second UE as a relay;
receive a radio resource control (RRC) reconfiguration message indicating a path switch and a timer associated with the path switch;
start the timer in response to reception of the RRC reconfiguration message; and
stop the timer in response to at least one of:
a successful completion of an SRB0 configuration,
reception of a first acknowledgment of an RRC reconfiguration complete message from the second UE,
reception of a radio link control (RLC) acknowledgement from a target relay UE,
reception of a second acknowledgment of the RRC reconfiguration complete message from the network entity, or a successful transmission of the RRC reconfiguration complete message.

27. The apparatus of claim 26, wherein the one or more processors are configured to cause the first UE to stop the timer in response to the successful transmission of the RRC reconfiguration complete message.

28. The apparatus of claim 26, wherein the path switch includes a change between a direct path to the network entity and an indirect path to the network entity via the second UE.

29. The apparatus of claim 26, wherein the path switch includes a change to a different relay for an indirect path to the network entity.

30. The apparatus of claim 26, wherein the first UE and the second UE are wireless devices that support sidelink communication.

31. The apparatus of claim 26, wherein at least one of the first UE and the second UE is a vehicle.

32. An apparatus for wireless communication at a network entity, comprising:
memory; and
one or more processors coupled to the memory, the one or more processors configured to cause the network entity to:
output system information indicating one or more timers associated with a radio resource control (RRC) connection establishment procedure or an RRC connection re-establishment procedure of a first user equipment (UE) via a relay, wherein a start time for the one or more timers is associated with a request from the first UE to the network entity via the relay; and
obtain a relayed request associated with an RRC connection for the first UE.

33. The apparatus of claim 32, wherein the one or more timers include an RRC connection establishment timer for the RRC connection establishment procedure via the relay.

34. The apparatus of claim 32, wherein the one or more timers include at least one RRC connection re-establishment timer for the RRC connection re-establishment procedure via the relay.

35. The apparatus of claim 34, wherein the one or more timers include two RRC connection re-establishment timer for the RRC connection re-establishment procedure via the relay.

36. The apparatus of claim 32, wherein the at least one or more processors are further configured to cause the network entity to output an RRC connection resume timer for an RRC connection resume procedure via the relay.

37. The apparatus of claim 32, further comprising:
at least one antenna; and
a transceiver coupled to the at least one antenna and the one or more processors, wherein the system information further includes an additional set of the one or more timers for the RRC connection establishment procedure or the RRC connection re-establishment procedure independent of the relay.

38. The apparatus of claim 32, wherein the one or more processors are further configured to cause the network entity to:
transmit an RRC setup message based on a procedure to resume the RRC connection or re-establish the RRC connection with at least one of a different network entity or a different relay.

39. The apparatus of claim 32, wherein the one or more processors are further configured to cause the network entity to:
transmit, to the first UE, an RRC reconfiguration message indicating an additional timer associated with a path switch.

40. The apparatus of claim 39, wherein the additional timer is associated with the path switch that includes a change between a direct path with the network entity and an indirect path with the network entity via the relay.

41. The apparatus of claim 39, wherein the additional timer is associated with the path switch that includes a change to a different relay for an indirect path between the network entity and the first UE.

42. An apparatus for wireless communication at a network entity, comprising:
memory; and
one or more processors coupled to the memory, the one or more processors configured to cause the network entity to:
output a radio resource control (RRC) reconfiguration message for a user equipment (UE), the RRC reconfiguration message indicating a timer associated with a path switch, wherein a start time for the timer is based on an RRC reconfiguration message indicating the path switch, and a stop time for the timer is based on at least one of:
a successful completion of an SRB0 configuration,
reception of a first acknowledgment of an RRC reconfiguration complete message from a second UE,
reception of a radio link control (RLC) acknowledgement from a target relay UE,
reception of a second acknowledgment of the RRC reconfiguration complete message from the network entity, or
a successful transmission of the RRC reconfiguration complete message; and
output an additional RRC reconfiguration message indicating the path switch.

43. The apparatus of claim 42, wherein the timer is associated with the path switch that includes a change between a direct path and an indirect path with the network entity via the second UE as a relay.

44. The apparatus of claim 42, wherein the stop for the timer is based on the successful transmission of the RRC reconfiguration complete message.

45. The apparatus of claim 42, wherein the timer is associated with the path switch that includes a change to a different relay for an indirect path between the network entity and the UE.

46. A method of wireless communication at a first user equipment (UE), comprising:
receiving, in system information, an indication of one or more timers associated with a radio resource control (RRC) connection establishment procedure or an RRC connection re-establishment procedure with a network entity via a relay;
transmitting a request associated with an RRC connection to a second UE to be relayed to the network entity;
starting the one or more timers based on a transmission of the request from the first UE to the network entity via the relay; and
monitoring for a response from the network entity based on the one or more timers associated with the RRC connection establishment procedure or the RRC connection re-establishment procedure via the second UE as the relay.

47. The method of claim 46, wherein the one or more timers include an RRC connection establishment timer for the RRC connection establishment procedure via the relay.

48. The method of claim 46, wherein the one or more timers include at least one RRC connection re-establishment timer for the RRC connection re-establishment procedure via the relay.

49. The method of claim 46, wherein the system information further includes an additional set of the one or more timers for one or more UEs that fail to support the RRC connection establishment procedure or the RRC connection re-establishment procedure via the relay, the method further comprising:
refraining from applying the additional set of the one or more timers for the RRC connection establishment procedure or the RRC connection re-establishment procedure.

50. The method of claim 46, wherein the request comprises an RRC connection establishment request or an RRC connection re-establishment request, the method further comprising:
stopping the one or more timers in response to one of a relay reselection or a selected relay becoming unsuitable.

51. The method of claim 46, further comprising:
entering an RRC idle state in response to the one or more timers expiring.

52. The method of claim 46, further comprising:
receiving, from the network entity, an RRC reconfiguration message indicating an additional timer associated with a path switch; and
performing the path switch based on the additional timer.

53. The method of claim 52, wherein the path switch includes a change between a direct path with the network entity and an indirect path to the network entity via the second UE.

54. The method of claim 52, wherein the path switch includes a change to a different relay for an indirect path to the network entity.

55. The method of claim 52, further comprising:
starting the additional timer in response to reception of the RRC reconfiguration message; and
stopping the additional timer in response to a successful transmission of an RRC reconfiguration complete message.

56. A method of wireless communication at a first user equipment (UE), comprising:
communicating with a network entity via a second UE as a relay;
receiving a radio resource control (RRC) reconfiguration message indicating a path switch and a timer associated with the path switch;
starting the timer in response to reception of the RRC reconfiguration message; and
stopping the timer in response to at least one of:
a successful completion of an SRB0 configuration,
reception of a first acknowledgment of an RRC reconfiguration complete message from the second UE,
reception of a radio link control (RLC) acknowledgement from a target relay UE, reception of a second acknowledgment of the RRC reconfiguration complete message from the network entity, or
a successful transmission of the RRC reconfiguration complete message.

57. The method of claim 56, wherein stopping the timer includes stopping the timer in response to the successful transmission of the RRC reconfiguration complete message.

58. The method of claim 56, wherein the path switch includes a change between a direct path with the network entity and an indirect path to the network entity via the second UE.

59. The method of claim 56, wherein the path switch includes a change to a different relay for an indirect path to the network entity.

60. A method of wireless communication at a network entity, comprising:
outputting system information indicating one or more timers associated with a radio resource control (RRC) connection establishment procedure or an RRC connection re-establishment procedure of a first user equipment (UE) via a relay, wherein a start time for the one or more timers is associated with a request from the first UE to the network entity via the relay; and
obtaining a relayed request associated with an RRC connection for the first UE.

61. The method of claim 60, wherein the one or more timers include an RRC connection establishment timer for the RRC connection establishment procedure via the relay.

62. The method of claim 60, wherein the one or more timers include at least one RRC connection re-establishment timer for the RRC connection re-establishment procedure via the relay.

63. A method of wireless communication at a network entity, comprising:
outputting a radio resource control (RRC) reconfiguration message for a user equipment (UE), the RRC reconfiguration message indicating a timer associated with a path switch, wherein a start time for the timer is based on an RRC reconfiguration message indicating the path switch, and a stop time for the timer is based on at least one of:
a successful completion of an SRB0 configuration,
reception of a first acknowledgment of an RRC reconfiguration complete message from a second UE,
reception of a radio link control (RLC) acknowledgement from a target relay UE,
reception of a second acknowledgment of the RRC reconfiguration complete message from the network entity, or
a successful transmission of the RRC reconfiguration complete message; and
outputting an additional RRC reconfiguration message indicating the path switch.

64. The method of claim 63, wherein the timer is associated with the path switch that includes a change between a direct path and an indirect path with the network entity via the second UE as a relay.

65. The method of claim 63, wherein the timer is associated with the path switch that includes a change to a different relay for an indirect path between the network entity and the UE.

66. An apparatus for wireless communication at a first user equipment (UE), comprising:
means for receiving, in system information, an indication of one or more timers associated with a radio resource control (RRC) connection establishment procedure or an RRC connection re-establishment procedure with a network entity via a relay;
means for transmitting a request associated with an RRC connection to a second UE to be relayed to the network entity;
means for starting the one or more timers based on a transmission of the request from the first UE to the network entity via the relay; and means for monitoring for a response from the network entity based on the one or more timers associated with the RRC connection establishment procedure or the RRC connection re-establishment procedure via the second UE as the relay.

67. The apparatus of claim 66, wherein the one or more timers include an RRC connection establishment timer for the RRC connection establishment procedure via the relay.

68. The apparatus of claim 66, wherein the one or more timers include at least one RRC connection re-establishment timer for the RRC connection re-establishment procedure via the relay.

69. The apparatus of claim 66, wherein the system information further includes an additional set of the one or more timers for one or more UEs that fail to support the RRC connection establishment procedure or the RRC connection re-establishment procedure via the relay, the apparatus further comprising:
means for refraining from applying the additional set of the one or more timers for the RRC connection establishment procedure or the RRC connection re-establishment procedure.

70. The apparatus of claim 66, wherein the request comprises an RRC connection establishment request or an RRC connection re-establishment request, the apparatus further comprising:
means for stopping the one or more timers in response to one of a relay reselection or a selected relay becoming unsuitable.

71. The apparatus of claim 66, further comprising:
means for entering an RRC idle state in response to the one or more timers expiring.

72. An apparatus for wireless communication at a first user equipment (UE), comprising:
means for communicating with a network entity via a second UE as a relay;
means for receiving a radio resource control (RRC) reconfiguration message indicating a path switch and a timer associated with the path switch;
means for starting the timer in response to reception of the RRC reconfiguration message; and
means for stopping the timer in response to a successful transmission of an RRC reconfiguration complete message.

73. The apparatus of claim 72, wherein the path switch includes a change between a direct path with the network entity and an indirect path to the network entity via the second UE.

74. The apparatus of claim 72, wherein the path switch includes a change to a different relay for an indirect path to the network entity.

75. An apparatus for wireless communication at a network entity, comprising:
means for outputting system information indicating one or more timers associated with a radio resource control (RRC) connection establishment procedure or an RRC connection re-establishment procedure of a first user equipment (UE) via a relay, wherein a start time for the one or more timers is associated with a request from the first UE to the network entity via the relay; and
means for obtaining a relayed request associated with an RRC connection for the first UE.

76. The apparatus of claim 75, wherein the one or more timers include an RRC connection establishment timer for the RRC connection establishment procedure via the relay.

77. The apparatus of claim 75, wherein the one or more timers include at least one RRC connection re-establishment timer for the RRC connection re-establishment procedure via the relay.

78. An apparatus for wireless communication at a network entity, comprising:
means for outputting a radio resource control (RRC) reconfiguration message for a user equipment (UE), the RRC reconfiguration message indicating a timer associated with a path switch, wherein a start time for the timer is based on an RRC reconfiguration message indicating the path switch, and a stop time for the timer is based on at least one of:
a successful completion of an SRB0 configuration,
reception of a first acknowledgment of an RRC reconfiguration complete message from a second UE,
reception of a radio link control (RLC) acknowledgement from a target relay UE,
reception of a second acknowledgment of the RRC reconfiguration complete message from the network entity, or
a successful transmission of the RRC reconfiguration complete message; and
means for outputting an additional RRC reconfiguration message indicating the path switch.

79. The apparatus of claim 78, wherein the timer is associated with the path switch that includes a change between a direct path and an indirect path with the network entity via the second UE as a relay.

80. The apparatus of claim 78, wherein the timer is associated with the path switch that includes a change to a different relay for an indirect path between the network entity and the UE.

81. A non-transitory computer-readable storage medium storing computer executable code for wireless communication at a first user equipment (UE), the code when executed by one or more processors causes the first UE to:
receive, in system information, an indication of one or more timers associated with a radio resource control (RRC) connection establishment procedure or an RRC connection re-establishment procedure with a network entity via a relay;
transmit a request associated with an RRC connection to a second UE to be relayed to the network entity;
start the one or more timers based on a transmission of the request from the first UE to the network entity via the relay; and
monitor for a response from the network entity based on the one or more timers associated with the RRC connection establishment procedure or the RRC connection re-establishment procedure via the second UE as the relay.

82. The non-transitory computer-readable storage medium of claim 81, wherein the one or more timers include an RRC connection establishment timer for the RRC connection establishment procedure via the relay.

83. The non-transitory computer-readable storage medium of claim 81, wherein the one or more timers include at least one RRC connection re-establishment timer for the RRC connection re-establishment procedure via the relay.

84. The non-transitory computer-readable storage medium of claim 81, wherein the system information further includes an additional set of the one or more timers for one or more UEs that fail to support the RRC connection establishment procedure or the RRC connection re-establishment procedure via the relay, and the code when executed by the one or more processors further causes the first UE to:
refrain from applying the additional set of the one or more timers for the RRC connection establishment procedure or the RRC connection re-establishment procedure.

85. The non-transitory computer-readable storage medium of claim 81, wherein the request comprises an RRC connection establishment request or an RRC connection re-establishment request, and the code when executed by the one or more processors further causes the first UE to:
stop the one or more timers in response to one of a relay reselection or a selected relay becoming unsuitable.

86. The non-transitory computer-readable storage medium of claim 81, wherein the code when executed by the one or more processors further causes the first UE to:
enter an RRC idle state in response to the one or more timers expiring.

87. A non-transitory computer-readable storage medium storing computer executable code for wireless communication at a first user equipment (UE), the code when executed by one or more processors causes the first UE to:
communicate with a network entity via a second UE as a relay;
receive a radio resource control (RRC) reconfiguration message indicating a path switch and a timer associated with the path switch;
start the timer in response to reception of the RRC reconfiguration message; and
stop the timer in response to a successful transmission of an RRC reconfiguration complete message.

88. The non-transitory computer-readable storage medium of claim 87, wherein the path switch includes a change between a direct path with the network entity and an indirect path to the network entity via the second UE.

89. The non-transitory computer-readable storage medium of claim 87, wherein the path switch includes a change to a different relay for an indirect path to the network entity.

90. A non-transitory computer-readable storage medium storing computer executable code for wireless communication at a network entity, the code when executed by one or more processors causes the network entity to:
output system information indicating one or more timers associated with a radio resource control (RRC) connection establishment procedure or an RRC connection re-establishment procedure of a first user equipment (UE) via a relay, wherein a start time for the one or more timers is associated with a request from the first UE to the network entity via the relay; and
obtain a relayed request associated with an RRC connection for the first UE.

91. The non-transitory computer-readable storage medium of claim 90, wherein the one or more timers include an RRC connection establishment timer for the RRC connection establishment procedure via the relay.

92. The non-transitory computer-readable storage medium of claim 90, wherein the one or more timers include at least one RRC connection re-establishment timer for the RRC connection re-establishment procedure via the relay.

93. A non-transitory computer-readable storage medium storing computer executable code for wireless communication at a network entity, the code when executed by one or more processors causes the network entity to:
output a radio resource control (RRC) reconfiguration message for a user equipment (UE), the RRC reconfiguration message indicating a timer associated with a path switch, wherein a start time for the timer is based on an RRC reconfiguration message indicating the path switch, and a stop time for the timer is based on at least one of:
a successful completion of an SRB0 configuration,
reception of a first acknowledgment of an RRC reconfiguration complete message from a second UE,
reception of a radio link control (RLC) acknowledgement from a target relay UE,
reception of a second acknowledgment of the RRC reconfiguration complete message from the network entity, or
a successful transmission of the RRC reconfiguration complete message; and
output an additional RRC reconfiguration message indicating the path switch.

94. The non-transitory computer-readable storage medium of claim 93, wherein the timer is associated with the path switch that includes a change between a direct path and an indirect path with the network entity via the second UE as a relay.

95. The non-transitory computer-readable storage medium of claim 93, wherein the timer is associated with the path switch that includes a change to a different relay for an indirect path between the network entity and the UE.

\* \* \* \* \*